(12) United States Patent
Goodrich

(10) Patent No.: US 10,981,712 B2
(45) Date of Patent: Apr. 20, 2021

(54) PROTECTIVE PRODUCTS SUCH AS ENVELOPES HAVING A UNIQUE COMBINATION OF INTERIOR PADDING OF EXPANDED SLIT SHEET PAPER AND EXTERIOR LINING OF EMBOSSED PAPER

(71) Applicant: David Paul Goodrich, Sedona, CT (US)

(72) Inventor: David Paul Goodrich, Sedona, CT (US)

( * ) Notice: Subject to any disclaimer, the term of this patent is extended or adjusted under 35 U.S.C. 154(b) by 0 days.

(21) Appl. No.: 16/531,017

(22) Filed: Aug. 3, 2019

(65) Prior Publication Data

US 2020/0039720 A1 Feb. 6, 2020

Related U.S. Application Data

(60) Provisional application No. 62/714,739, filed on Aug. 5, 2018, provisional application No. 62/798,065, filed on Jan. 29, 2019, provisional application No. 62/806,849, filed on Feb. 17, 2019.

(51) Int. Cl.
| | | |
|---|---|---|
| *B65D 81/03* | (2006.01) | |
| *B65B 5/04* | (2006.01) | |
| *B65D 81/02* | (2006.01) | |
| *B65D 27/00* | (2006.01) | |

(52) U.S. Cl.
CPC .............. *B65D 81/03* (2013.01); *B65B 5/04* (2013.01); *B65D 27/00* (2013.01); *B65D 81/022* (2013.01)

(58) Field of Classification Search
CPC ...... B65D 81/03; B65D 27/00; B65D 81/022; B65B 55/20; B65B 11/00; B31D 5/006; B31D 2205/0023; B31D 3/005; D21H 27/02; D21F 11/006; B31F 1/07;
(Continued)

(56) References Cited

U.S. PATENT DOCUMENTS

| | | |
|---|---|---|
| 683,784 A | 10/1901 | McCulloch |
| 1,946,838 A | 2/1934 | Cofrin |
| 2,656,291 A | 10/1953 | Doll et al. |

(Continued)

FOREIGN PATENT DOCUMENTS

| | | |
|---|---|---|
| DE | 3612136 A | 1/2001 |
| JP | 2010228111 A | 10/2010 |

(Continued)

OTHER PUBLICATIONS

International Search Report and Written Opinion dated Dec. 27, 2019, issued in counterpart application No. PCT/US2019/45027. (11 pages).

*Primary Examiner* — Christopher R Demeree
(74) *Attorney, Agent, or Firm* — Westerman, Hattori, Daniels & Adrian, LLP

(57) ABSTRACT

A protective product, such as, e.g., an envelope or pouch, is provided that includes at least one expanded slit paper sheet in an expanded state, and an embossed paper sheet facing the expanded slit paper sheet and fixed to the expanded slit paper sheet along at least a portion of a length in an expansion direction of the expanded slit sheet paper. In the preferred embodiments, the embossed paper sheet has a plurality of embossings that increase the rigidity of the embossed paper sheet, thereby inhibiting deformation of the embossed paper sheet that is fixed to the expanded slit sheet paper.

123 Claims, 16 Drawing Sheets

(58) Field of Classification Search
CPC ..... B31F 2201/0733; B31F 2201/0738; B32B 38/06; B32B 3/28
USPC .......... 229/92.8, 68.1, 87.02, 403, 928; 206/521, 594, 812; 383/109, 110; 428/135, 172, 34.2, 137; 156/264; 162/280, 362; 493/966, 58; 53/472
See application file for complete search history.

(56) References Cited

U.S. PATENT DOCUMENTS

| | | | |
|---|---|---|---|
| 2,856,323 A | | 10/1958 | Gordon |
| 3,104,197 A | | 9/1963 | Back et al. |
| 3,220,116 A | | 11/1965 | Freuler |
| 3,266,972 A | | 8/1966 | Cramer |
| 3,269,393 A | | 8/1966 | Ackermann |
| 3,668,055 A | * | 6/1972 | Gerard ................ B31F 1/07 428/184 |
| 3,908,071 A | | 9/1975 | Heim et al. |
| 4,515,840 A | | 5/1985 | Gatward |
| 5,030,189 A | | 7/1991 | Hightower |
| 5,154,956 A | | 8/1992 | Fradrich et al. |
| 5,503,611 A | | 4/1996 | Richter et al. |
| 5,538,778 A | | 7/1996 | Hurwitz et al. |
| 5,544,473 A | | 8/1996 | Maida et al. |
| 5,667,871 A | | 9/1997 | Goodrich et al. |
| 5,688,578 A | | 11/1997 | Goodrich |
| 5,782,735 A | | 7/1998 | Goodrich et al. |
| 6,024,832 A | | 2/2000 | Trani et al. |
| 6,039,682 A | | 3/2000 | Dees et al. |
| 6,458,447 B1 | | 10/2002 | Cabell et al. |
| 6,712,930 B2 | | 3/2004 | Koivukunnas |
| 6,995,674 B2 | * | 2/2006 | Turner ............... B65D 73/0078 235/492 |
| 7,918,966 B2 | | 4/2011 | Trani et al. |
| 9,945,077 B2 | | 4/2018 | Hashiguchi et al. |
| 2002/0060034 A1 | | 5/2002 | Hollmark et al. |
| 2004/0076798 A1 | | 4/2004 | Larsson et al. |
| 2007/0240841 A1 | | 10/2007 | Trani et al. |
| 2012/0008880 A1 | | 1/2012 | Toth |
| 2012/0219762 A1 | | 8/2012 | Bazbaz |
| 2016/0067938 A1 | | 3/2016 | Goodrich |
| 2017/0203866 A1 | | 7/2017 | Goodrich |
| 2018/0127197 A1 | | 5/2018 | Goodrich |
| 2018/0222665 A1 | | 8/2018 | Goodrich |
| 2018/0229910 A1 | | 8/2018 | Kohn et al. |
| 2018/0370702 A1 | | 12/2018 | Goodrich |

FOREIGN PATENT DOCUMENTS

| | | |
|---|---|---|
| WO | 1984/002936 A1 | 8/1984 |
| WO | 2015/035335 A1 | 3/2015 |

\* cited by examiner

PROTECTIVE PRODUCTS SUCH AS ENVELOPES HAVING A UNIQUE COMBINATION OF INTERIOR PADDING OF EXPANDED SLIT SHEET PAPER AND EXTERIOR LINING OF EMBOSSED PAPER

CROSS REFERENCE TO RELATED PATENT APPLICATIONS

This application claims the benefit of (1) U.S. Provisional Application 62/714,739 filed Aug. 5, 12018, entitled SLIT SHEET EXPANDED MATERIAL IN COMBINATION WITH EMBOSSED PAPER SHIPPING ENVELOPES, (2) U.S. Provisional Application 62/798,065, filed Jan. 29, 2019, entitled EXPANDED SLIT SHEET MATERIAL IN COMBINATION WITH EMBOSSED PAPER SHIPPING ENVELOPES, and (3) U.S. Provisional Application 62/806,849, filed Feb. 17, 2019, the entire disclosures of which are incorporated herein by reference.

BACKGROUND OF THE INVENTION

Field of the Invention

This invention relates the use of expanded slit sheet paper and indented Kraft paper for the manufacturing of a shipping envelope or pouch.

Description of the Background Art

The background art has been manufactured with plastic bubble, plastic bubble-paper combination, Kraft Paper and shredded newsprint and the like. The plastic materials are quite flexible and provide adequate cushioning at the start whereas, the Kraft Papers are somewhat less flexible and provide less cushioning.

SUMMARY OF THE INVENTION

The preferred embodiments overcome the above and/or other problems in the background art.

One noteworthy object of some preferred embodiments of the present invention is to overcome the shortcomings of the prior art. In accordance with a broad embodiment of the invention, the use of the expanded slit sheet material and the indented Kraft sheet as the outer material provides a lightweight very protective alternative that eliminates the need for plastics or heavier weight paper alternatives. The paper alternatives are costlier to manufacture and cost more for the end user to ship due to its increased weight as compared to plastic.

Another noteworthy object of some preferred embodiments of the present invention is to create a lightweight expanded composite material to make cushioning pads where the use of expanded slit material as a wrap as described in PCT/US2014/054615 is not feasible.

According to some embodiments, a protective product is provided that includes: at least one expandable slit paper sheet in an expanded state; and an embossed paper sheet facing the expanded slit paper sheet and fixed to the expanded slit paper sheet along at least a portion of a length in an expansion direction of the expanded slit sheet paper, the embossed paper sheet having a plurality of embossings that increase the rigidity of the embossed paper sheet, whereby inhibiting deformation of the embossed paper sheet that is fixed to the expanded slit sheet paper.

In some embodiments, the plurality of embossings in the embossed paper sheet include an array of embossed shapes distributed on a face of the embossed paper sheet. In some embodiments, the array of embossed shapes includes an array of polygons. In some embodiments, the plurality of embossings include a plurality of ribs that extend across a substantial portion of a face of the embossed sheet.

In some embodiments, the embossings include indentations that extend inwardly towards the expanded slit sheet paper and/or bulges that extend outwardly away from the expanded slit sheet paper. In some embodiments, the embossings extend inwardly or outwardly from a plane of the embossed paper sheet a distance of less than 0.1 inches. In some embodiments, the embossings extend inwardly or outwardly from a plane of the embossed paper sheet a distance of less than 0.075 inches. In some embodiments, the embossings extend inwardly or outwardly from a plane of the embossed paper sheet a distance of less than 0.05 inches. In some embodiments, the embossings extend inwardly or outwardly from a plane of the embossed paper sheet a distance of less than 0.03 inches.

In some embodiments, the expanded paper provides over 80% of cushioning provided by a wall of a pouch of the protective product. Similarly, in some embodiments, the embossed paper sheet provides less than 20% of the cushioning provided by a wall of a pouch of the protective product.

In some embodiments, the protective product further includes a second embossed paper sheet facing an opposite side of the at least one expanded slit paper sheet.

In some embodiments, the embossed paper sheet is fixed to the expanded slit paper sheet only along a periphery of the expanded slit paper sheet. In some embodiments, the embossed paper sheet is free from connection to the expanded slit paper sheet within a central portion of the expanded slit paper sheet. In some embodiments, the embossed paper sheet is free from connection to the expanded slit paper sheet across a substantial portion of the area of the embossed paper sheet. In some embodiments, the embossed paper sheet contacts but is free from connection to the expanded slit paper sheet across a substantial portion of the area of the embossed paper sheet.

In some embodiments, the protective product is a recyclable paper product. In some embodiments, the protective product is an envelope having a pouch including the embossed paper sheet and the expanded slit paper together folded to form front and back walls of the pouch.

In some embodiments, wherein the at least one expanded slit paper sheet in an expanded state includes a plurality of expanded slit paper sheets in an expanded state layered alongside each other.

In some embodiments, the plurality of expanded slit papers sheets includes two expanded slit paper sheets, and further including a second embossed paper sheet facing an opposite side of the two expanded slit paper sheets.

In some embodiments, the protective product is an envelope and the embossings of the embossed paper sheet are indented towards the at least one expanded slit paper sheet within at least a label-receiving region of a face of the embossed paper sheet. In some embodiments, the protective product further includes: an address label fixed to the envelope at the label-receiving region.

In some embodiments, the protective product is an envelope and the embossings of the embossed paper sheet are bulged outwardly from the at least one expanded slit paper sheet and face into an interior of a pouch of the envelope, whereby the embossings help to limit friction applied to an item that is inserted into the pouch.

In some embodiments, the embossments are hexagons. In some embodiments, adjacent hexagons share a side, whereby the hexagons are connected.

In some embodiments, the plurality of embossings are sufficient to counter the inherent tendency of the expanded slit paper to retract and thereby inhibit the wrinkling of the embossed paper.

In some embodiments, the protective product is a cushioning member.

In some embodiments, the protective product is a package or envelope.

In some embodiments, the expanded slit paper sheet and the embossed paper sheet are part of a protective wall of the protective product.

According to some other embodiments, a method is provided that includes:

a) providing a protective product that includes: at least one expandable slit paper sheet in an expanded state; and an embossed paper sheet facing the expanded slit paper sheet and fixed to the expanded slit paper sheet along at least a portion of a length in an expansion direction of the expanded slit sheet paper, the embossed paper sheet having a plurality of embossings that increase the rigidity of the embossed paper sheet, whereby inhibiting deformation of the embossed paper sheet that is fixed to the expanded slit sheet paper; and b) placing an item within a pouch of the protective product with the expanded slit paper sheet providing cushioning to protect the item within the pouch and with the embossed paper inhibiting deformation of the embossed paper sheet that is fixed to the expanded slit sheet paper.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims. Throughout this application, all references, including all patents and patent applications referred to in this application are incorporated herein by reference in their entireties.

BRIEF DESCRIPTION OF THE DRAWINGS

The preferred embodiments of the present invention will be described by way of example and not limitation with the accompanying drawings, in which.

Figure 1:
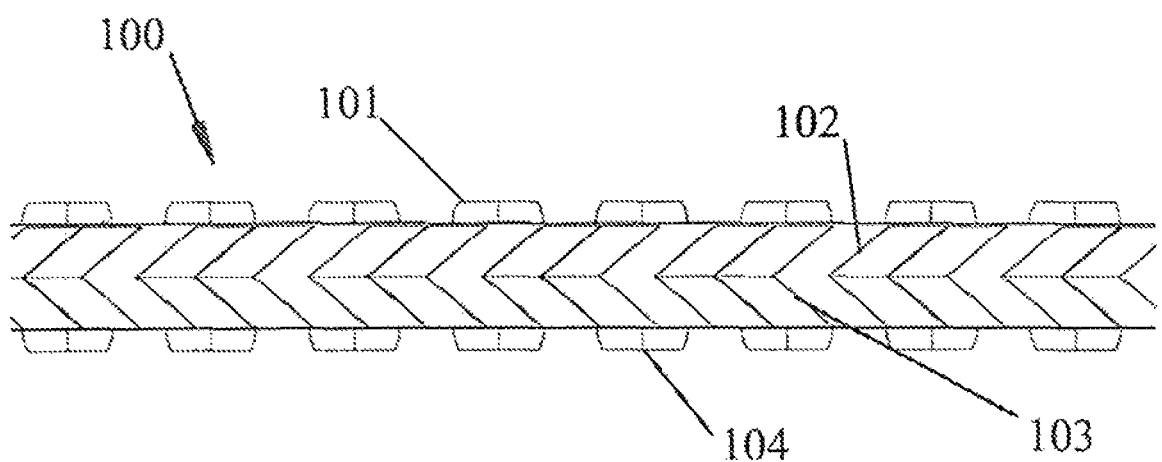
FIG. 1 is a side view of the composite material of expanded slit sheets enveloped in indented Kraft sheets.

The above-listed figures include illustrative embodiments of the invention with exemplary and non-limiting examples of aspects of the present invention depicted to scale. Although the above-listed figures show illustrative examples to scale, other embodiments can be constructed that are not limited to the scale examples shown in the drawings. For example, in some embodiments, variations in degree can be 10% or more, or 20% or more or even further in other embodiments.

DEFINITIONS RELATING TO THE PREFERRED EMBODIMENTS

For the purposes of distributing, mailing, packaging, and/or shipping items, the present invention the term "envelope" means a package or pouch that contains information or a product inside the package. The envelope can be sealed on all sides for shipping or it can be inserted into a container such as a shipping box.

For the purposes of the present invention the term "pouch" means a product in which items or documents for shipment are placed. The filled pouch can be placed inside a shipping container and does not require a shipping label.

For the purposes of the present invention the term "in-the-box shipping" means an envelope that only ships with other items within a corrugated box that eliminates the requirement for a durable anti-rip outer layer.

For the purposes of the present invention the term "mailing envelope" means an envelope designed for shipping by USPS, UPS, or FedEx and the like that has a durable anti-rip exterior layer that provides protection against tearing during shipping.

For the purposes of the present invention the term "uniformly opening slit" means the system disclosed and claimed in PCT/US2014/054615.

For the purposes of the present invention the term "randomly opening slit" means the system disclosed and claimed in U.S. patent application Ser. No. 15/001168, published as U.S. 2017/0203866, wherein adjacent layers have differing angles of inclination of the land areas, and adjacent layers have interlocking patterns and wherein expanded layers resist contraction and nesting.

For the purposes of the present invention the term "expandable" as applied to paper sheets, means a paper having a slit pattern as disclosed in U.S. Pat. Nos. 5,538,778, 5,667,871 5,688,578, and 5,782,735, and PCT/US2014/054615, the disclosures of which are incorporated by reference herein, as though recited in full.

The slit pattern enables the paper to be expanded in length, with a related decrease in width. The slit pattern produces a paper that increases in length due to the slit pattern when processed in an expander as taught in pending U.S. applications Ser. No. 15/001,168, 15/428,144, 15/820,514, and PCT/US2014/054615

For the purposes of the present invention the term "slit sheet" means an expandable paper sheet having a slit pattern as disclosed in pending U.S. applications Ser. No. 15/001,168, (US 2017-0203866), Ser. No. 15/428,144, (US 2018/0222665), Ser. No. 15/820,514 (US-2018-0127197-A1), and PCT/US2014/054615.

For the purposes of the present invention the term "extensible" as applied to paper sheets, means a paper that is processed such that a paper sheet is able to stretch as taught in U.S. Pat. No. 3,908,071, U.S. patent application Ser. No. 14/901,977 (U.S. Pat. No. 9,945,077), WO 1984002936, US patent application publication US 2002/0060034, US 2007/0240841 (U.S. Pat. No. 7,918,966), and U.S. Pat. Nos. 3,104,197, 3,220,116, 3,266,972, 3,269,393, 3,908,071, 6,024,832, 6,458,447, 6,712,930, 7,918,966, and 9,945,077, the disclosures of which are incorporated by reference herein, as though recited in full.

For the purposes of the present invention the term "extensible slit sheet paper" means a paper that is both extensible and expandable as disclosed in US patent application publication US-2018-0370702-A, filed Jun. 26, 2018, the disclosure of which is incorporated by reference herein, as though recited in full.

For the purposes of the present invention the terms "downward" and "upward" mean a direction and orientation with respect to the interior of the envelope or pouch.

Downward means the embossment is directed toward the interior of the envelope or pouch and upward is directed toward the exterior of the envelope or pouch.

Figure 9:
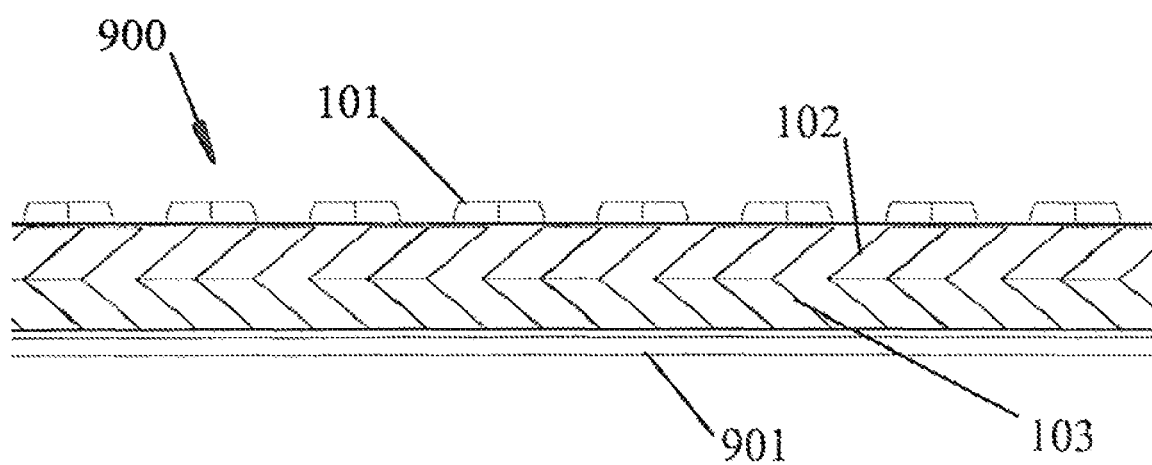
FIG. 9 is a side view of the composite material of expanded slit sheets enveloped in an outer layer of indented Kraft and an interior layer of flat Kraft.

For the purposes of the present invention the terms "embossed" and "indented" mean a design that is raised above and/or is below the surface of the original flat surface, non-embossed areas of the paper. Embossed designs can be seen to bulge or protrude upward as seen in FIG. 9 (101) or downward from the exterior sheet 1001 and the interior sheet 1003 of the original flat surface in FIGS. 10 and 11, or both upward and downward as seen in FIG. 12.

For the purposes of the present invention the terms "sunk embossed", "sunk relief" and "recessed embossed" mean a design that does not rise beyond the original flat surface. Sunk/Sunken embossed designs can be seen in FIG. 10 (1004) to protrude downward from the surface of the original flat surface as well as in FIG. 11.

For the purposes of the present invention the terms "embossed" and "indented" mean a design that is raised above and/or is below the surface of the original flat surface, non-embossed areas of the paper. Embossed design 1005 can be seen to bulge or protrude upward above the surface 1001 of the original flat surface in FIG. 10.

DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

The disclosure of U.S. Pat. No. 2,856,323 describing the manufacture of embossed paper and US non-provisional applications Ser. Nos. 14/480,319, 15/428,144, 15/820,514, and provisional applications 15/001,168, 16/018,702 describing expanded slit sheet manufacturing and designs are incorporated by reference herein, as if recited in full.

Figure 2:
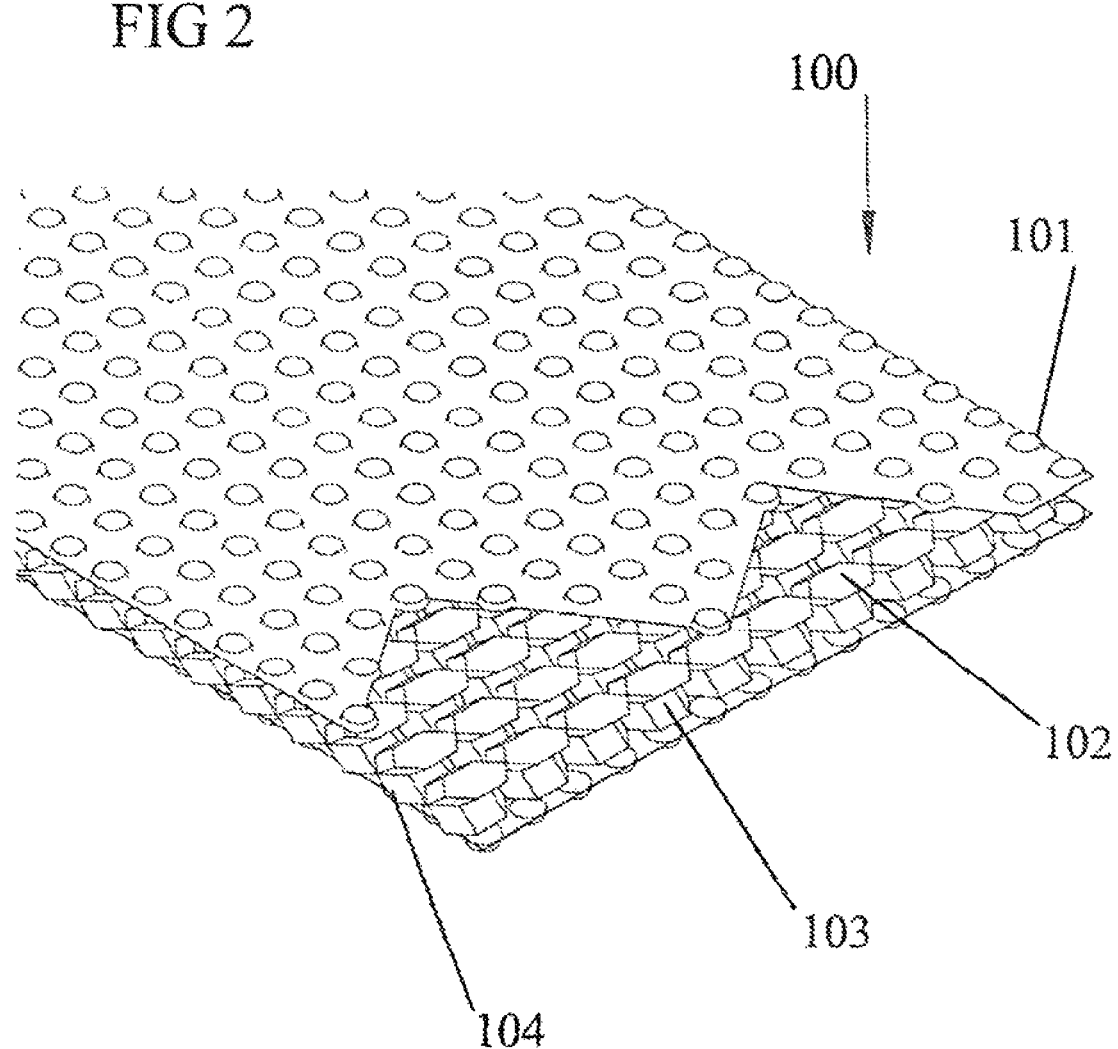
FIG. 2 is a perspective view of the composite material of expanded slit sheets enveloped in indented Kraft sheets.
Figure 4:
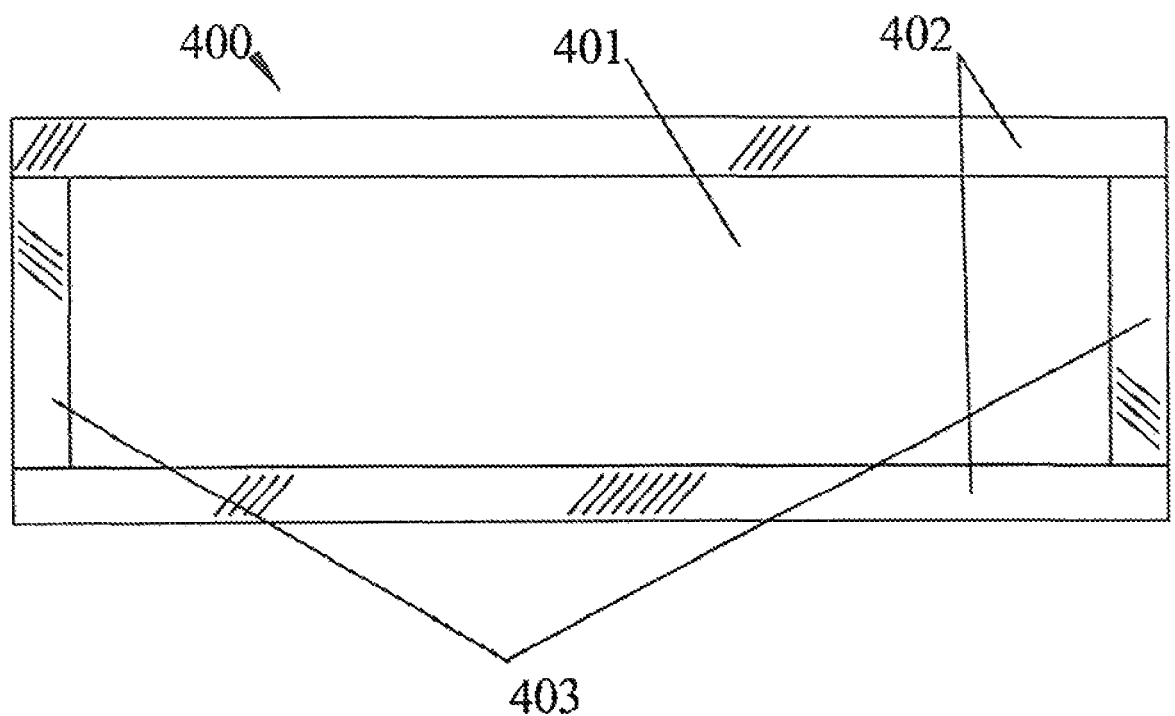
FIG. 4 is a top view of the composite material.
Figure 5:
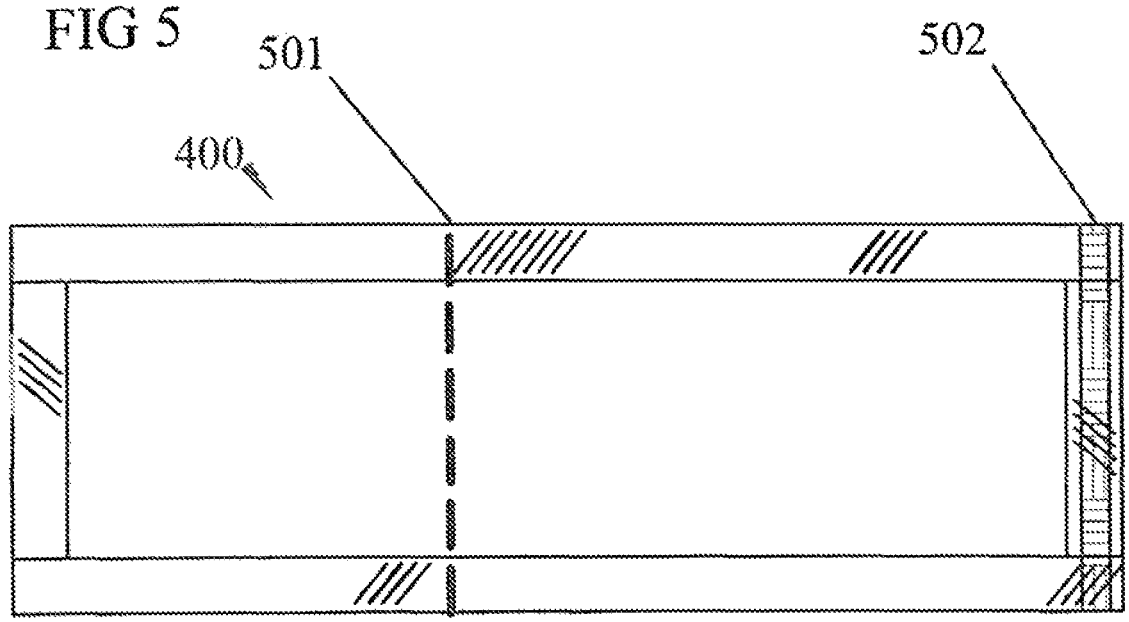
FIG. 5 is a top view of the composite material with fold lines and double-sided adhesive.
Figure 7:
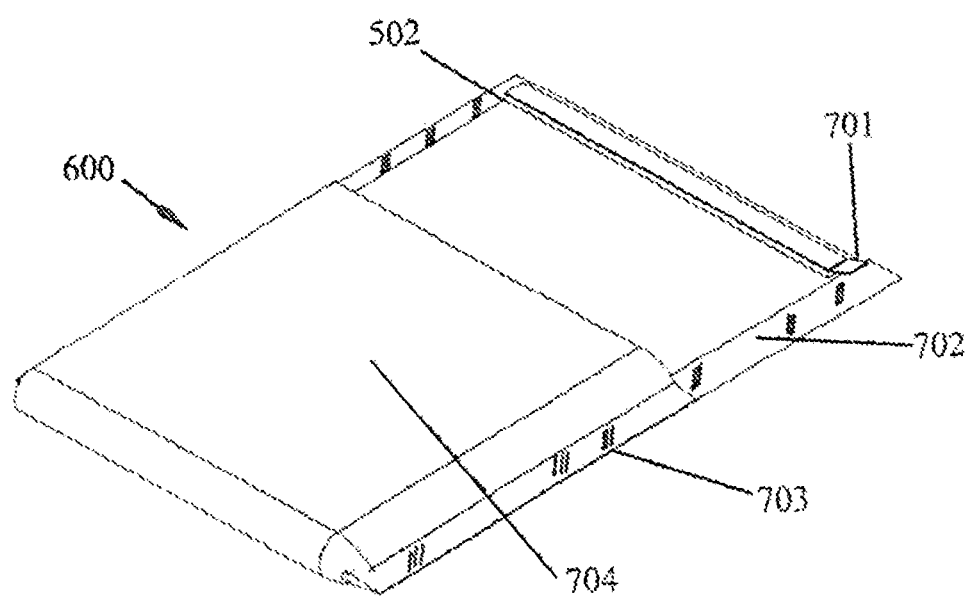
FIG. 7 is a perspective view of the composite unclosed envelope with release liner.

The present invention employs expanded slit sheet material in combination with an exterior layer of embossed paper to produce a padded envelope with cushioning properties. As shown in FIG. 1, the first preferred embodiment uses a four-layer composite starting with the first layer of embossed paper 104, laminated, on all edges (as shown in FIGS. 4 402 and 403) to the two cross-layer expanded slit paper layers as found in non-provisional Ser. No. 14/480,319, with a fourth top-layer of embossed paper. This produces a paper pad that is completely recyclable and made mostly of recycled paper. Following construction of the paper pad two further steps are necessary to make the envelope. The first is to fold the pad that is shown in FIG. 5 to a folded state as shown in FIG. 7 so that a pouch area 704 is formed with a further crushing and gluing of laminated sides 703. The last step is to place a double-sides adhesive strip 502 as shown in FIG. 7 with a release liner 701. As shown in the top view of FIG. 4, the middle area 401 is where the expanded slit sheet will be placed and will further be placed under the laminated areas of 403. In FIG. 2, the expanded slit sheet 102 and 103, as shown, are the full length but, not the full width of the embossed paper 101 and 104. It is not necessary for the expanded layers to fully extend in width but, just length. In FIG. 4 the adhesion areas 403 trap the expanded slit sheet between the embossed layers to keep the expanded slit sheet expanded to provide the cushioning and total thickness that the expanded slit sheet has to offer.

Figure 11:
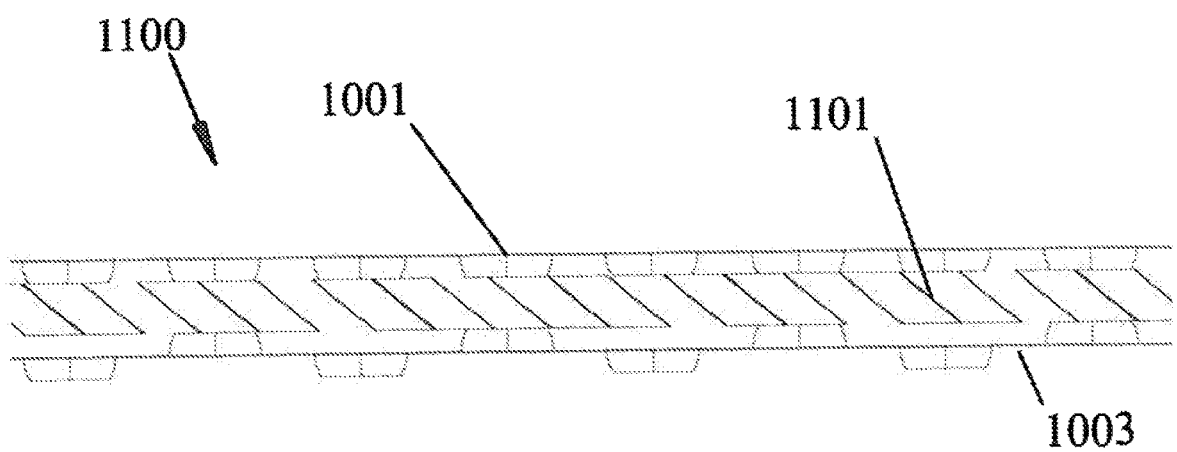
FIG. 11 is a side view of the composite material of an expanded slit sheet enveloped in an outer layer of indented Kraft facing downward and an interior layer of double-sided indented paper.
Figure 12:
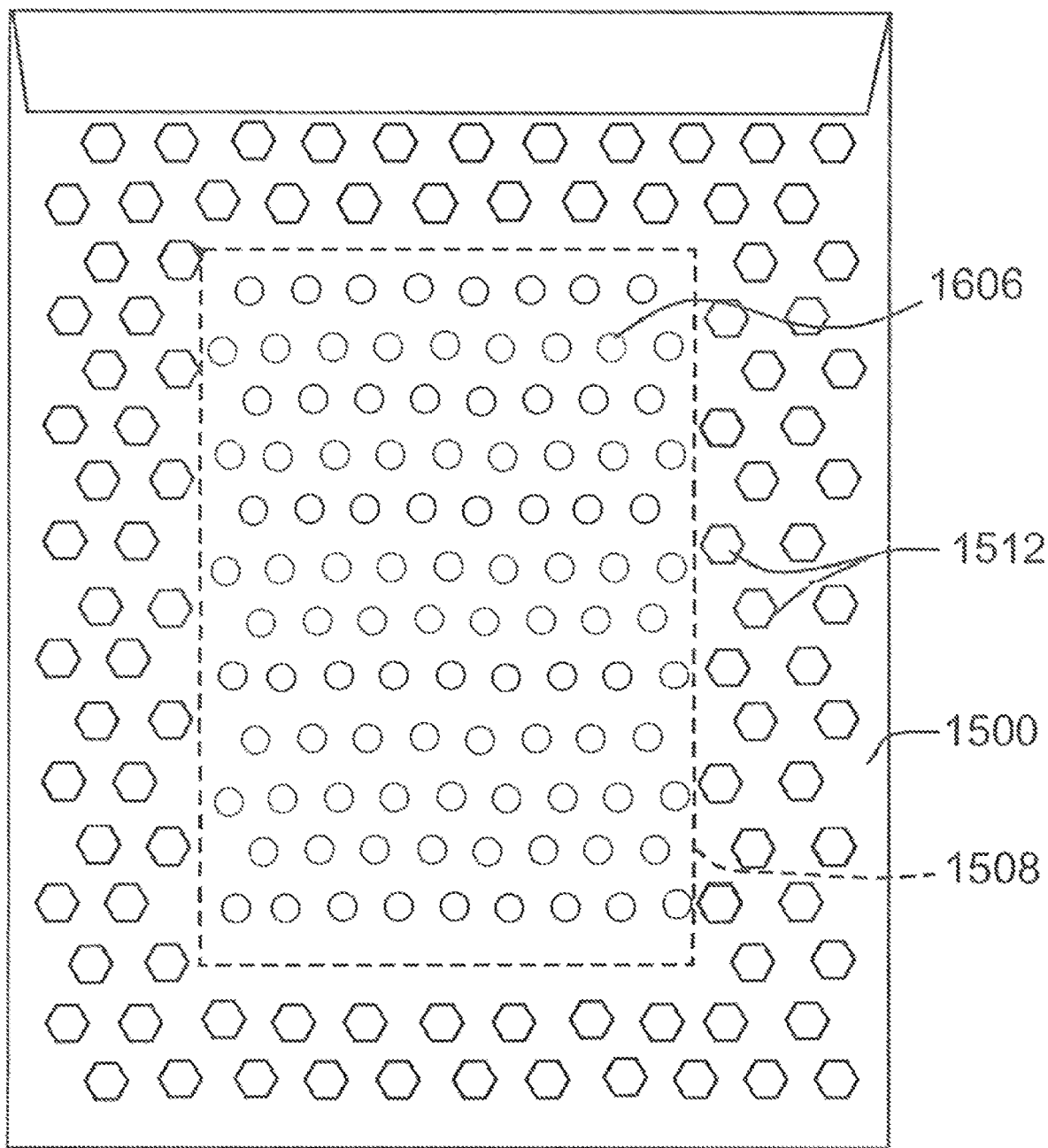
FIG. 12 is a side view of an envelope having an indented label receiving region.

The second preferred embodiment, as shown in FIG. 11, uses a three-layer composite that is equivalent in design to the first preferred embodiment except for reducing the expanded slit sheets to one-layer for applications requiring less cushioning.

It is understood that the envelope of the preferred embodiment of the present art could be made with a single layer or three or more layers of expanded slit sheet material and/or the use of expanded slit sheet material of chaotic cell structure as disclosed in U.S. patent application Ser. No. 15/820,514.

The pouch, within the envelope construction, is used by placing an article for shipping within the pouch area 704 and then using the adhesive strip by removing the release liner and folding over the top portion of the pad onto the pouch area and allowing the adhesive strip to seal the envelope.

This embossed paper, as found within the art, and in the preferred embodiment is made with 50# Kraft paper as per the TAPPI standard paper weight specification of 3,000 square feet equaling the basis weight of 50 pounds, enables the envelope to perform in ways that were unexpected. The embossed paper as shown in FIG. 2 embossment 101 is made by using matching male-female dies that for embossments as described in prior art patent U.S. Pat. No. 2,856,323, in this case circular embossments, that create a unique stiffening property that still provides the flexibility that is required for placing items within the pouch. It is noted that the embossments can made to have a plurality of shapes or configurations. For example, in some preferred embodiments, the embossments have polygonal configurations, such as, e.g., rectangles, pentagons, hexagons or other multi-sided shapes or can have rounded shapes, such as, e.g., circles, ovals or other rounded shapes, or can have irregular shapes, such as, e.g., shapes of alphanumeric symbols, logos, pictorial images or the like.

An additional benefit that the embossed paper has, in combination with the expanded slit material, is that it provides the ability to hold the expanded slit sheet material stretched without creating wrinkles on the outer paper. Although heavier weight paper could be used, this increased weight and stiffness and adds to the postage costs and makes loading items within the pouch more difficult. The embossed paper also reduces the surface area, and therefore friction, for loading an item within the envelope. It is preferable that the embossment face at least inward so that the item being packed has the reduced friction. The outer layer indents, in instances where a label is required for postage and address, will preferably face downward to provide a flat surface area for the label to adhere. In circumstances where the label must adhere aggressively, advantageously, extensible paper as found in non-provisional application Ser. No. 16/018,702 can be used. In this case, the outer layer can be a flat sheet that is not embossed.

In cases where flat paper is preferred on both sides of the envelope, one additional way of overcoming the wrinkling effect that the expanded slit material has as it tries to retract, is to use extensible paper as found in US non-provisional application 16/018,702. The extensible art requires ⅔ rds less strength required to stretch the expanded slit sheet material. In this case a light weight non-embossed Kraft outer paper can be utilized for use where the envelope is not used for individual shipping. In this case the envelope is used within and as part of a consolidated shipment that requires a corrugated box, or in-the-box shipping, with several other items to be shipped. This type of shipment does not require a durable anti-rip layer. An Anti-rip flat Kraft paper would be a thicker paper of 60# Kraft paper or more that inhibits tearing. Envelopes that are not shipped individually utilizing the extensible paper can use 30# Kraft paper for in-the-box shipments.

An additional benefit to the embossed paper in combination with the expanded slit material is the increased packaging protection that it provides. Expanded slit paper, although extremely protective as a wrap, must be placed in a container to provide the cushioning. The embossed paper's bulk mimics a very light duty corrugated box with a slight undulating thickness of approximately 3 times the thickness of paper in the preferred embodiment much like the sine wave of the inner layer found within a corrugated box. This provides an initial shock protection that inhibits tearing that can occur with smooth papers.

An additional benefit is the ability to hold the envelope by hand securely as the embossment adds to the friction between the envelope and the hands for easy handling as compared to smooth papers and plastic.

Recessed embossments (sunk-relief) can be smaller (in terms of surface area removed from the surface of a label) in the label region than in the remainder of the surfaces of the envelope, whereas raised/relief embossment can be larger (in terms of surface area presented to a label) than in the remainder of the surfaces of the envelope.

The label region can be free of embossments, but preferably, the label receiving embossed region is provided with raised and/or sunk embossments. Advantageously, the label contacts at least 25% of the surface of the exterior layer of embossed paper either by way of contact with the upper surfaces of upward embossments or original flat surface of sunk/downward embossments. Preferably, at least 50% of the surface of the exterior layer of embossed paper either by way of contact with the upper surfaces of upward embossments or original flat surface of sunk/downward embossments is provided for contact with the adhesive of a label.

In order to provide sufficient embossing, advantageously at least about 25% of the surface of the paper is embossed (upward and/or downward). Preferably at least 50% of the surface of the exterior paper and the interior indented paper are provided with upward or downward embossments or a combination thereof.

The label receiving embossed region is sufficient to receive a standard 8.5×5.5 inch, depending upon the size of the envelope. Common label sizes are 8.5×5.5 Inches, 6.78"×4.75", and 3.5"×3.75", and are provided with a permanent self-adhesive.

It should be understood that the shape and size of the embossments can vary greatly and still provide the same properties necessary to inhibit wrinkling and allow for easy loading.

In some illustrative embodiments, the embossments can include a plurality of polygonal or other shaped regions have a maximum diameter of between about 0.1 to 1 inch width, or in some preferred embodiments, of about 0.15 to 0.5 inch in width, or, in some preferred embodiments, about 0.2 to 0.5 inch in width, or, in some illustrative embodiments, about .25 inch in width. In some embodiments, the embossments have a maximum height or depth (i.e., depending on whether such are indented inwards or extending upwards) of less than 0.1 inches, and, more preferably, less than 0.075 inches, and, more preferably, less than 0.05 inches, and, more preferably, between about 0.02 to 0.03 inches, and in some illustrative examples about 0.026-0.0275 includes in height.

In some illustrative embodiments, the embossments include an array of undulating dimples.

In the preferred embodiments, the embossments have a substantially flat central surface that is generally parallel to a plane of the sheet that is embossed with such embossments. Firstly, this helps to reduce thickness of the embossed sheet. Secondly, this also helps to maximize label attachment surface in some embodiments.

In the preferred embodiments, the sides of the embossments that extend transversely away from the plane of the embossed sheet extends generally perpendicularly to the plane of the embossed sheet for a substantial portion of the height of the embossments. In some preferred embodiments, the sides do not extend exactly vertically, but are slightly inclined. In some preferred embodiments, the peaks of the sides that connect to the substantially flat central surfaces of the embossments are rounded or chamfered to, e.g., inhibit potential tearing. Similarly, in some preferred embodiments, the bases of the sides that connect to the substantially flat central surfaces of the embossments are also rounded or chamfered to, e.g., inhibit potential tearing.

For reference, the following paragraphs are direct quotations from U.S. 2018/0370702, incorporated by reference above:

"In accordance with a broad embodiment of the invention, the use of extensible paper reduces the pulling force necessary to stretch the expanded slit sheet material and thereby expands the market to include, e.g., void fill usage and lighter weight papers for greater cushioning effect for very fragile items."

"In accordance with another embodiment of the invention, the use of extensible paper reduces the tendency of the slit paper to tear during the expanding of the expandable slit sheet paper without negating the ability to tear the expanded slit sheet paper from the roll of expandable slit sheet paper at the end of the wrapping step."

"In accordance with another embodiment of the present invention an extensible slit sheet paper product is produced having a slit pattern that forms open cells upon expansion of the paper product. The paper product is an extensible paper having an extensibility in the range from 1-9% in the machine direction and 1-5% in the cross direction. Preferably the extensible paper has an extensible range from 1-6% in the machine direction and 1-4% in the cross direction. Most preferably the extensible paper has an extensible range from 1-4% in the machine direction and 1-3% in the cross direction."

"In accordance with another embodiment of the present invention an extensible slit sheet paper product is produced having a slit pattern that forms open cells upon expansion of said paper product, wherein said slit sheet is expandable by applying an expansion force in the range from 0.15 to 0.22 pounds per inch, to form at least one expanded sheet having an array of hexagonal cells and where the extensible paper has an extensible range from 1-6% in the machine direction and 1-4% in the cross direction."

For further reference, the following paragraphs are further direct quotations from U.S. 2018/0370702, incorporated by reference above:

"However, unexpectedly, the extensible slit sheet imparts an ease of expansion that greatly reduces the force required to expand the slit sheet, not based on the main purpose for extensible paper which is to increase its tensile strength but, rather, its capability to stretch. Since extensible paper is higher in cost and Kraft paper was strong enough, it was not previously known that extensible paper could be of benefit for making slit paper sheets of the types found in, e.g., U.S. Pat. Nos. 5,538,778, 5,667,871, 5,688,578, and 5,782,735, and U.S. Non-Provisional Application Ser. No. 15/428,144. For example, it was not appreciated that an extensible slit sheet could have provided an equivalent strength to light weight, thin papers that previously had no applicability as a wrapping product. Light weight Kraft paper tears more easily than heavier weights of Kraft paper. It has now been found that the extensible paper enables the use of the lighter weight expanded slit-sheet papers that also advantageously provide gentler cushioning required by fragile items when a slit sheet is expanded, in contrast to the more rigid cushioning provided by heavier weight expanded slit-sheet papers."

"Reference is particularly made to the graph of Table 1 on page 5 of U.S. Patent Publication No. 2016/0355985 (now U.S. Pat. No. 9,945,077) as if recited in full, that describes paper strength based on certain manufacturing techniques. Within the graph is a column describing elongation at the point of paper break (or tearing of fibers) separated into two sub columns of the machine direction (MD) and cross direction (CD), also referred to as transverse direction. The elongation percentage of Table 1 ranges from 5.3% to 7.1% in the cross direction (CD) and 3.3% to 10.6% in the machine direction (MD)."

"Reference is also made to U.S. Pat. No. 3,266,972 within Table Ill of column 5 which references elongation in the percentage range from 3.7% to 4.6% in the CD or cross direction and 9.7% to 11.1% in the machine direction."

"In both '985 and '972, the variations are based on the manufacturing process that places an emphasis on tensile strength and stretch in either the cross direction or machine direction accordingly."

"The present inventor has discovered that for the purposes of expanding an extensible slit sheet paper for use as a packaging wrap and/or void fill, machine direction extensible ranges from 1%-9% provide an adequate extensibility, with 1% to 6% preferred, and 1% to 4% most highly preferred. The lower the extensibility coincides with lower costs of the paper per square foot. As indicated above, it should be understood that extensibility is measured on unslit paper."

"In some alternative embodiments, machine direction extensibility ranges of the extendible slit sheet paper can have ranges of:
a) from 1.5%-9%, or more preferably from 1.5% to 6% preferred, or even more preferably from 1.5% to 4%; or
b) from 2%-9%, or more preferably from 2% to 6% preferred, or even more preferably from 2% to 4%; or
c) from 3%-9%, or more preferably from 3% to 6% preferred, or even more preferably from 3% to 4%."

"For the purposes of expanding the slit sheet paper for use as a packaging wrap and/or void fill, it has been found that cross direction extensible ranges from 1%-5% provides an adequate extensibility with 1% to 4% preferred, and 1% to 3% most highly preferred."

"In some alternative embodiments, cross direction extensibility ranges of the extendible slit sheet paper can have ranges of: a) from 1.5%-5%, or more preferably from 1.5% to 4%, or even more preferably from 1.5% to 3%; or b) from 2%-5%, or m ore preferably from 2% to 4%, or even more preferably from 2% to 3%."

For further reference, the following paragraph is a further direct quotation from U.S. 2018/0370702, incorporated by reference above:

"Extensible paper is a known paper which, because of special treatment during its production, presents considerable extensibility both in the longitudinal direction (i.e. in the direction of its advancement along the production line) and in the transverse direction (i.e. in the direction perpendicular to the preceding). This treatment consists essentially of passing the paper web not yet formed and presenting a moisture content of about 35%/45% between two rollers rotating at different speeds. One of these rollers, generally the lower roller, is made of rubber and is rotated at lower speed, while the upper roller is made of steel and comprises in its cylindrical surface a continuous spiral-shaped groove. The different material nature and the different speed of the two rollers results in a sort of longitudinal accumulation of the paper forming material and prepares it for longitudinal extensibility, by an amount which can reach 15-20%. At the same time, the spiral groove performs a double function: on the one hand it causes a sort of transverse accumulation of the material forming the paper to prepare it for transverse extensibility. By an amount which can reach 10-15%. On the other band the spiral groove contributes to maintaining longitudinal advancement of the processed paper web along the machine."

For further reference, the following paragraph is a further direct quotation from U.S. 2018/0370702, incorporated by reference above:

"By the expression "extensible papers" is meant a paper having an increased elongation (generally a minimum of about 6%) in the machine direction."

For further reference, the following paragraph is a further direct quotation from U.S. 2018/0370702, incorporated by reference above:

"These and other objects which will be apparent from the ensuing description are attained according to the invention by a multilayer papery material comprising at least one first three dimensional structure sheet exhibiting reliefs having maximum sizes which are lower than the width of the original sheet, said reliefs being obtained through localized stretching of said first sheet which has an original degree of extensibility of not less than 5% in all the directions, and at least one second sheet made of papery material coupled to said first structure sheet and defining empty spaces with the reliefs thereof.

As it can be seen from the figures, in the embodiment shown in FIG. 1 the multilayer material of the invention consists of two layers 2, 4 of paper presenting extensibility characteristics of not less than 5% both in a longitudinal and in a transverse direction, and preferably not less than 15%."

For further reference, the following paragraph is a further direct quotation from U.S. 2018/0370702, incorporated by reference above:

"Extensible paper is a known paper which, because of special treatment during its production, presents considerable extensibility both in the longitudinal direction (i.e. in the direction of its advancement along the production line) and in the transverse direction (i.e. in the direction perpendicular to the preceding). This treatment consists essentially of passing the paper Web, not yet formed and presenting a moisture content of about 35%/45%, between two rollers rotating at different speeds. One of these rollers, generally the lower roller, is made of rubber and is rotated at lower speed, While the upper roller is made of steel and comprises in its cylindrical surface a continuous spiral-shaped groove. The different material nature and the different speed of the two rollers results in a sort of longitudinal accumulation of the paper forming material and prepares it for longitudinal extensibility, by an amount which can reach 15-20%. At the same time, the spiral groove performs a double function: on the one hand it causes a sort of transverse accumulation of the material forming the paper, to prepare it for transverse extensibility, by an amount which can reach 10-15%. On the other hand the spiral groove contributes to maintaining longitudinal advancement of the processed paper web along the machine."

The accompanying figures set forth details on relation to some preferred, and non-limiting, embodiments of the inventions.

FIG. 1 is a side view of the paper pad 100 where the use of the double-cross layering of expanded slit sheet materials, as found in non-provisional patent application Ser. No. 14/480,319, with 102 facing forward and 103 facing backward are sandwiched between embossed papers 101 and 104.

FIG. 2 is a perspective view of the composite padding material 100 where 101 and 104 are the embossed outer paper layers and expanded slit cross layers 102 and 103 are within.

Figure 3:
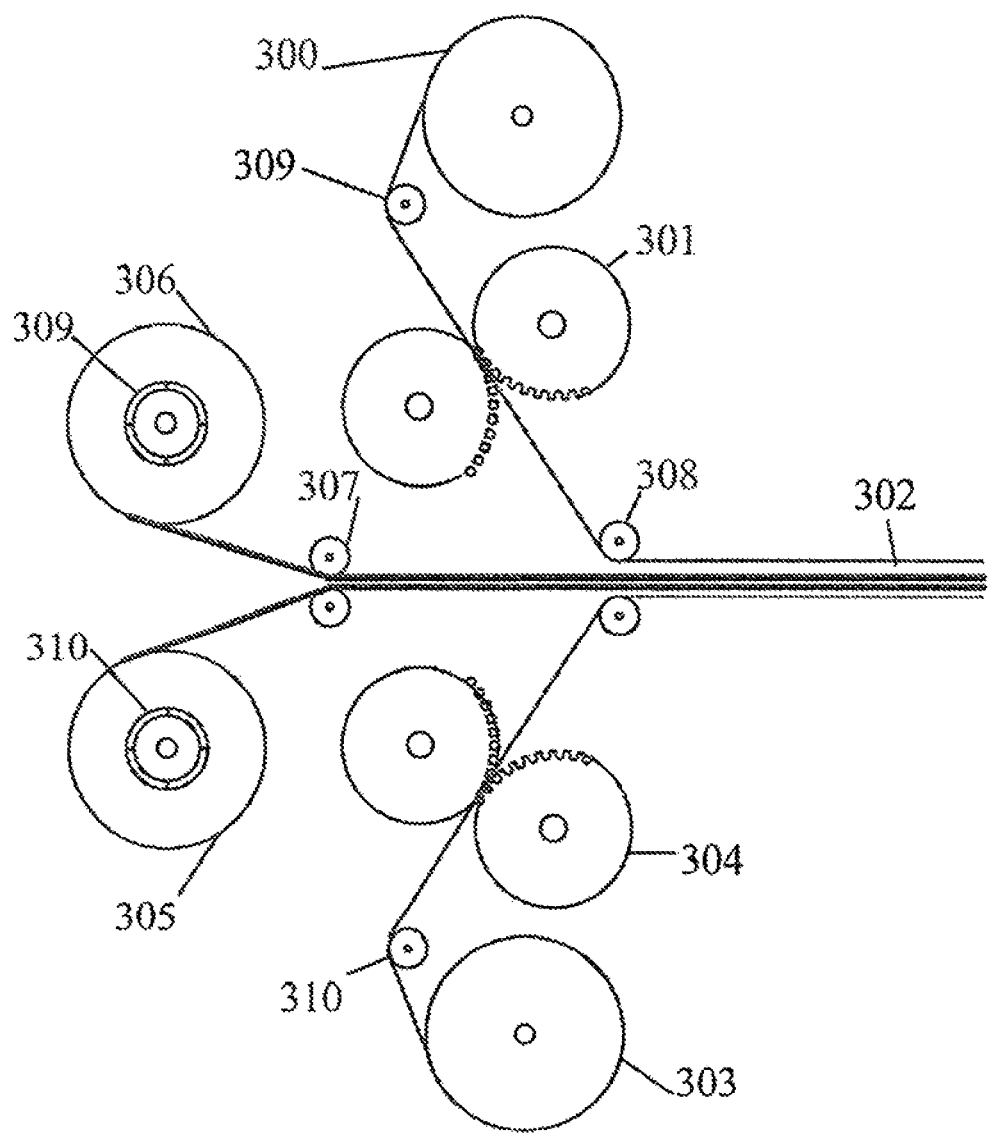
FIG. 3 is a schematic side view of the manufacturing process.

FIG. 3 is a schematic side view of the pad making process where Kraft paper 300 and 303 are feed to an idler roller 309 and 310 and then through the embossment dies pairs 301 and 304 and around idler rolls 308 making the outer layer of combining area 302. Unexpanded slit material rolls 305 and 306 are fed to Velcro rolls 307 and are stretched using a braking mechanism 309 and 310 that slows the unwinder to allow for stretch and continues to the combining area 302.

FIG. 4 is a top view of the areas of the composite of embossed and expanded slit material 400 and where the crushing wheels laminate the edges 402 and 403. The expanded slit paper, not shown as it is behind the top layer of embossed paper is found in the area of 401.

FIG. 5 is the top view of the composite material 400 showing the dotted line 501 for the fold area to make the pouch. Double sided adhesive 502 is placed on the leading edge of the pad.

Figure 6:
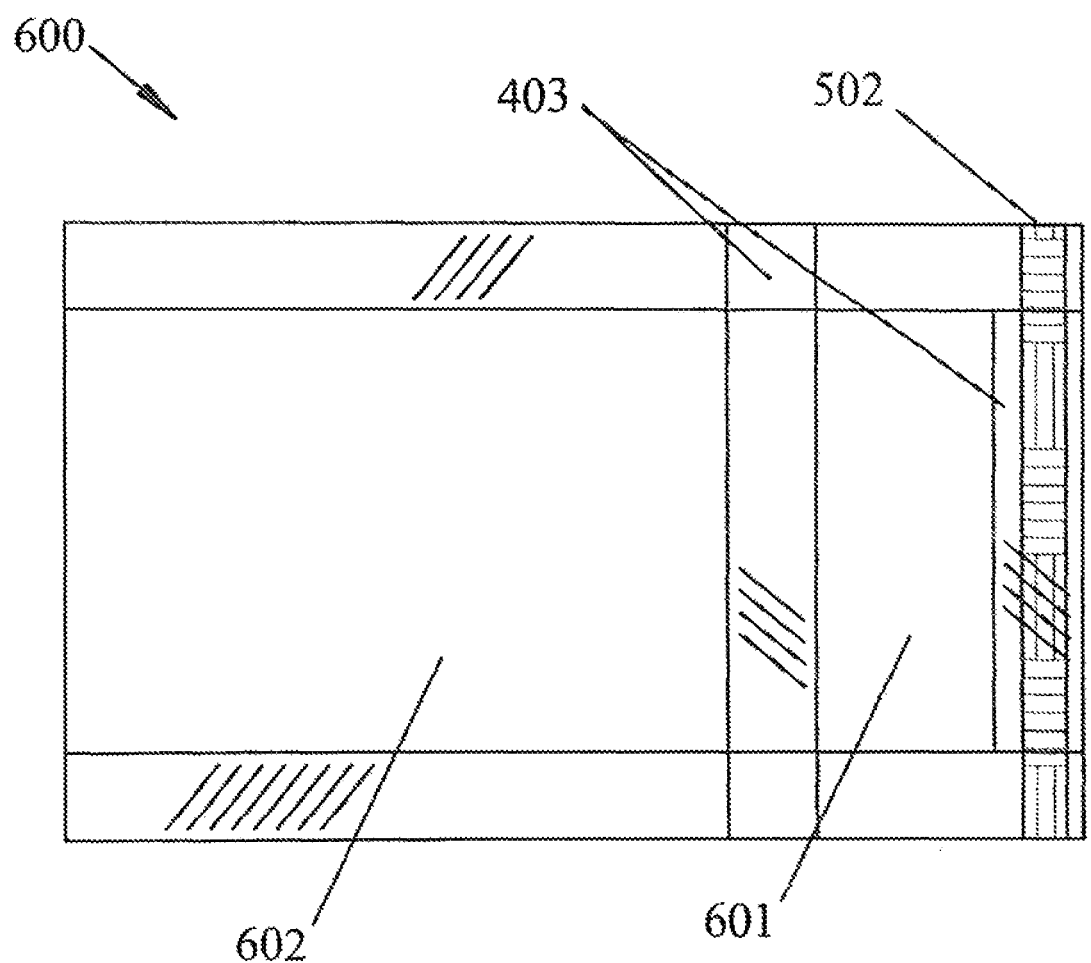
FIG. 6 is a top view of the composite material folded into the unclosed envelope shape.
Figure 8:
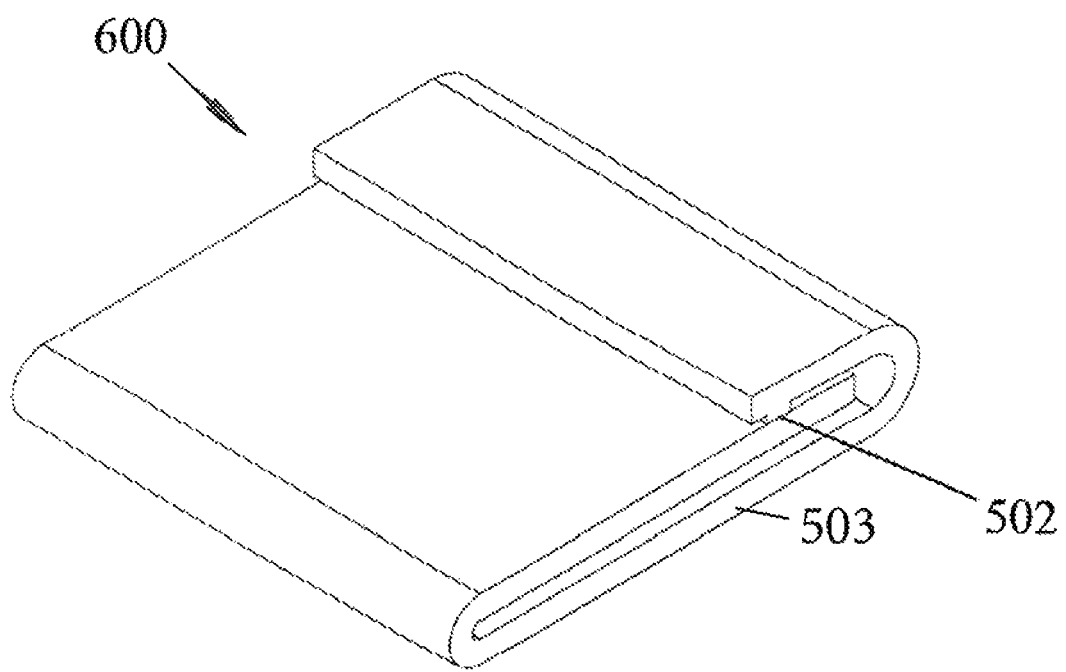
FIG. 8 is a perspective view of the composite closed envelope.

FIG. 6 is the top view of the folded pad making the padded envelope 600. Double sided adhesive 502 is placed at the laminating area 403 on the leading edge to provide adhesive for the envelope to close. Open area 601 is the area of the fold-over providing the extra length needed for cushioning the envelope over the crushed and laminated area 403 using double sided tape 502 as shown in FIG. 8. The double-sided tape 502 will adhere just beyond 403 when it is folded over as shown in FIG. 8.

FIG. 7 is a perspective view of the envelope 600 of FIG. 6 in the open position with double sided tape 502 combined with the release liner 701. Areas of crush-glue adhesion 702 and 703 are shown creating pouch area 602.

FIG. 8 is a perspective view of the closed envelope 600 showing double sided tape 502 with the release liner removed for adhesion. The crush sides, as illustrated in FIG. 7 are not shown in FIG. 8 in order to demonstrate the thickness of sides 503 for protection that the envelope provides and the fold-over area that provides a generous area to be used dependent on the size of the item placed within the envelope.

FIG. 9 is a side view of the composite material 900 of expanded slit sheets 102 and 103 enveloped in an outer layer of indented Kraft 101 and an interior layer of flat Kraft 901.

Figure 10:
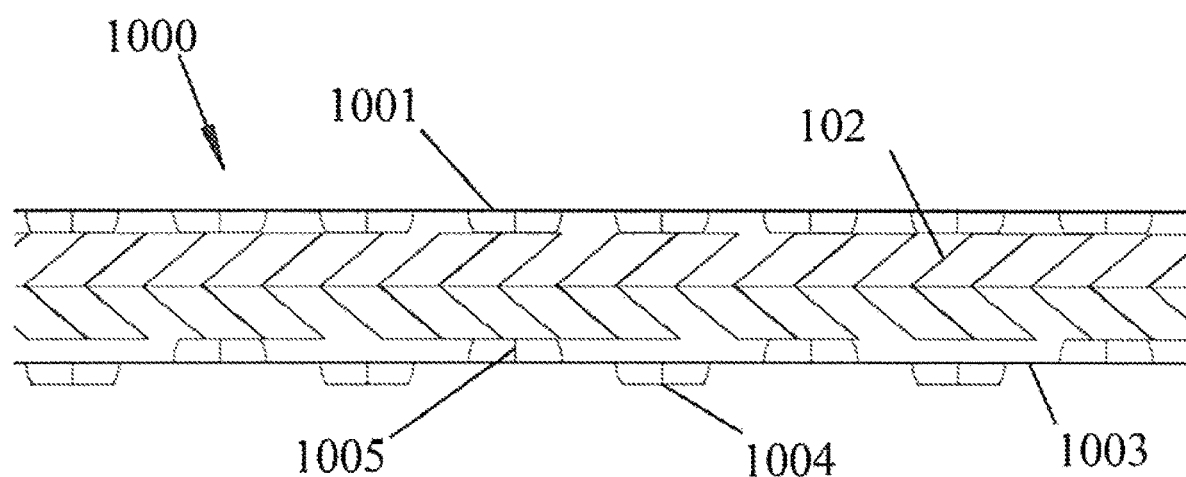
FIG. 10 is a side view of the composite material of expanded slit sheets enveloped in an outer layer of indented Kraft facing downward and an interior layer of double-sided indented paper.

FIG. 10 is a side, cross sectional view of the paper pad 1000 where the use of the double-cross layering of expanded slit sheet materials, as found in non-provisional patent application Ser. No. 14/480,319, with one layer of slit paper cells facing forward and a second layer facing backward. The two layers 102, 103 are sandwiched between interior embossed paper 1003 having downward facing embossments 1004 and upward facing embossments 1005.

FIG. 11 is a side, cross sectional view of a single expanded layer paper pad 1100 where the use of the single-layer expanded slit sheet 1101 is sandwiched between the exterior layer of embossed paper 1001 having downward facing indents (embossments) and interior layer 1003 embossed paper having both upward and downward facing indents (embossments).

FIG. 12 is a side view of an envelope having a label receiving region 1508 and indents 1606 within the label receiving region. The region outside of the label receiving region 1508 can have indents 1512 that are of the same or different design with respect to the indents 1606.

Figure 13:
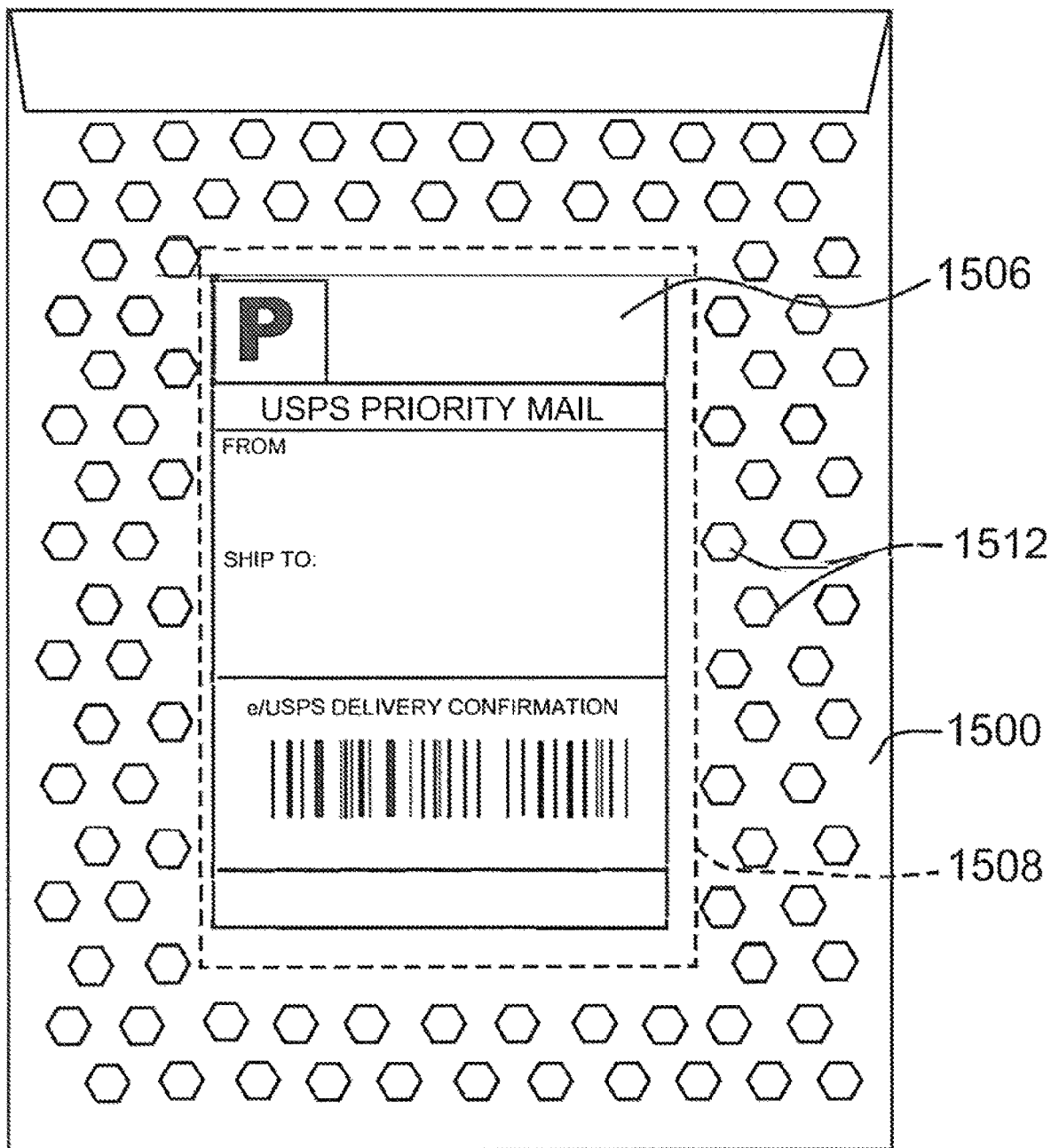
FIG. 13 is a side view of an envelope having a label adhered to an indented label receiving region.

FIG. 13 is a side view of an envelope having a label receiving region 1508 and a label 1506 within the label receiving region 1508 within the embossed paper 1500.

Figure 14:
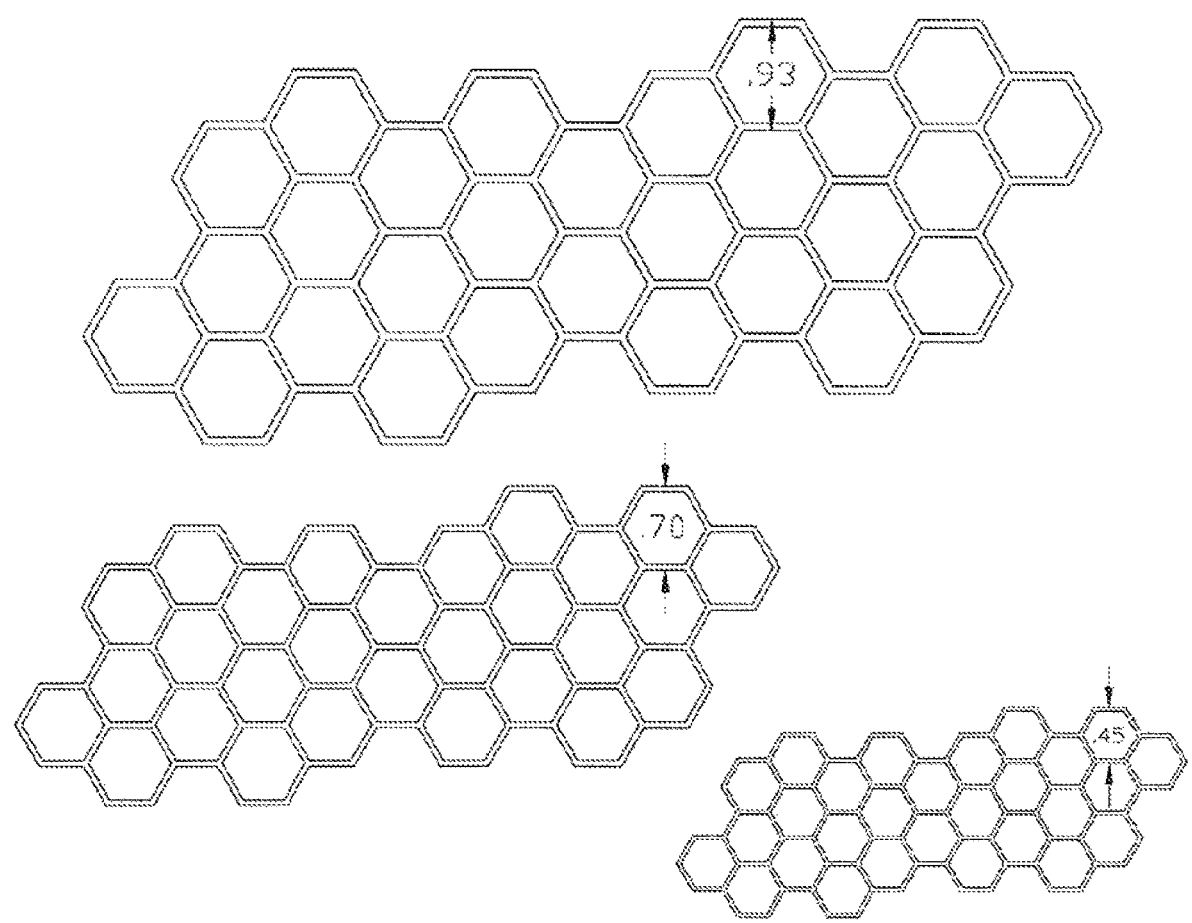
FIG. 14 is a diagram showing illustrative embossments according to some other preferred embodiments of the invention.

FIG. 14 is a schematic diagram showing some illustrative manner of making embossments according to some embodiments of the invention. In particular, while the embodiments shown in, e.g., FIGS. 1-13 depict embossments that are discrete shapes (e.g., spaced apart separated shapes), such as, e.g., polygons (e.g., hexagons) that are either indented into or extended upward from the embossed paper surface, in some embodiments the embossments are not discrete shapes, but can include, e.g., linear ribs or ridges or a linear pattern across the embossed paper. For example, as shown in the embodiment of FIG. 14, in this illustrated embodiment the embossment includes a plurality of hexagonal shapes; however, rather than each hexagonal shape being embossed (i.e., indented or raised from the paper surface), only the outlines of the respective hexagonal shapes are embossed (e.g., indented) from the paper surface. Thus, the embodiments shown in FIG. 14 show arrays of hexagonal cells, in which the centers of the hexagonal cells are along the plane of the embossed paper (i.e., rather than being indented or raised as in other embodiments), which the perimeter of the hexagonal cells are embossed (e.g., indented). Thus, the narrow walls of the hexagonal cells will be embossed (e.g., indented), such as, e.g., to create a network of embossed ribs that extend across the embossed paper. In these illustrative embodiments shown in FIG. 14, the embossments can, thus, involve an array of connected polygons (e.g., hexagons shown) with the periphery of the polygons (e.g., hexagons) embossed downward to give the appearance of a double border polygon (e.g., hexagon).

FIG. 14 also shows some illustrative dimensions across the polygons. For example, as shown at the top of FIG. 14, in some embodiments, the diameter of the hexagons can be about 0.93 inches, while as shown in the middle of FIG. 14, in some embodiments, the diameter can be about 0.70 inches, while as shown at the bottom of FIG. 14, in some embodiments the diameter can be about 0.45 inches. In other embodiments, the diameters can be within a range of about 0.2 inches to 2.0 inches, or, more preferably, within a range of about 0.3 to 1.5 inches.

In addition, as indicated above, the figures show illustrative embodiments drawn to scale. Accordingly, in some illustrative embodiments, the widths of the embossed lines (e.g., indented downwards lines) can be about as shown in the respective examples shown in FIG. 14. In some embodiments, the dimensions of the embossed lines can vary as discussed herein.

Figure 15:
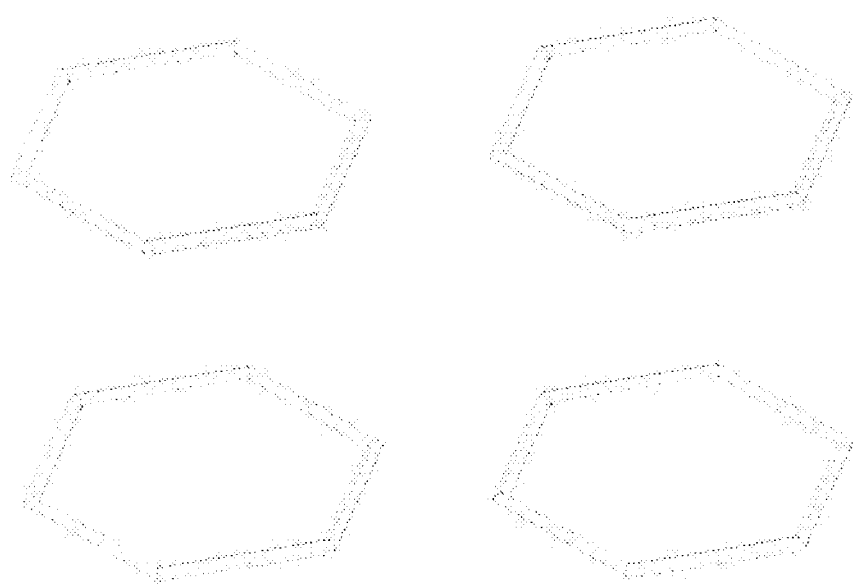
FIG. 15 is a diagram showing illustrative embossments according to some further preferred embodiments of the invention.

FIG. 15 shows some other embodiments of embossments that are similar to that shown in FIG. 14, except that the adjacent polygons (e.g., hexagons) are not connected, such that independent shaped embossments are distributed on a surface of the embossed paper, in a manner generally similar to that shown in, e.g., FIGS. 12 and 13, except that, like the embodiments shown in FIG. 14, the embossed region is only along the perimeter edges of the polygon (e.g., hexagons). In this manner, the embossment does not create a long or linearly connected ridge that extends substantially across the embossed paper. Although FIG. 15 shows a polygonal shape, it should be appreciated that a similar perimeter embossing (e.g., indentation) can be used with other distributed shapes, such as, e.g., with rounded shapes and/or irregular shapes.

Although the various embodiments shown include a plurality of like shapes distributed in arrays, in some embodiments, combinations of different embossments or shapes can be employed. For example, the embodiment shown in FIG. 12 includes both round and polygonal embossments. Other embodiments can combine any number of embodiments of embossments described herein.

In some embodiments, embossments similar to that shown in one of the examples of FIG. 14 can be distributed over an entire or a substantially entire face of an envelope (similar to how embossments are distributed across the envelope shown in FIG. 12) or embossments similar to that shown in the example of FIG. 15 can be distributed over an entire or a substantially entire face of an envelope (similar to how embossments are distributed across the envelope shown in FIG. 12).

In the preferred embodiments, the embossments that are formed on the embossed paper are provided in order in increase the rigidity of the embossed paper so that when the embossed paper is connected to the expanded paper, the expanded paper does not distort the embossed paper. Otherwise, the tendency for the expanded paper to contract can lead to distortion of the paper. Accordingly, the present invention advantageously employs an embossed paper to enhance the rigidity of the embossed paper so that it does not distort. Accordingly, in some preferred embodiments, the enhanced rigidity is selected to be sufficient to prevent distortion of the embossed paper due to contraction forces of the expanded paper, such that it resists contraction that would lead to distortion of the paper.

As indicated above, it should be understood that the shape and size of the embossments can vary greatly and still provide the same properties necessary to inhibit wrinkling and allow for easy loading.

As also indicated above, in some illustrative embodiments, the embossments can include a plurality of polygonal or other shaped regions have a maximum diameter of between about 0.1 to 1 inch width, or in some preferred embodiments, of about 0.15 to 0.5 inch in width, or, in some preferred embodiments, about 0.2 to 0.5 inch in width, or, in some illustrative embodiments, about 0.25 inch in width. In some embodiments, the embossments have a maximum height or depth (i.e., depending on whether such are indented inwards or extending upwards) of less than 0.1 inches, and, more preferably, less than 0.075 inches, and, more preferably, less than 0.05 inches, and, more preferably, between about 0.02 to 0.03 inches, and in some illustrative examples about 0.026-0.0275 includes in height.

Notably, in the preferred embodiments, the embossments are designed to avoid distortion of the paper (as discussed above) rather than to provide a cushioning effect. In contrast, in some background products, a sheet is adapted to include enlarged dimples that are used to provide a cushioning. Towards that end, the dimples in those contexts are designed to absorb lateral forces (e.g., to compress and absorb lateral forces). Towards that end, such background dimples have greater depth (i.e., to provide such cushioning lateral to the plane of the paper). In addition, background dimples can benefit from having air retained within such dimples (e.g., similar to a pillow) to increase softness by providing an air cushion.

In contrast, in the present invention, the embossed paper does not provide a significant or even any amount of cushioning in the preferred embodiments, but, rather, cushioning is provided by the expanded paper. Notably, due to the expanded paper, there is no reason to even apply background cushioning since the expanded paper achieves the necessary cushioning. In the preferred embodiments, the expanded paper provides over 70% of the cushioning provided by the envelope (i.e., to protect contents within the pouch), or, more preferably, over 80% of the cushioning provided by the envelope, or, more preferably over 90% of the cushioning provided by the envelop, or, more preferably over 95% of the cushioning provided by the envelop. Similarly, in the preferred embodiments, the embossed paper (i.e., the embossing in the embossed paper) provides less than 30% of the cushioning provided by the envelope (i.e., to protect contents within the pouch), or, more preferably, less than 20% of the cushioning provided by the envelop, or, more preferably, less than 10% of the cushioning provided by the envelop, or, more preferably, less than 5% of the cushioning provided by the envelope.

Moreover, in the preferred embodiments, the embossments preferably are limited in height to avoid increasing the thickness of the embossed paper. Among other things, an increased thickness results in added bulk and additional difficulties in shipping and packaging since less envelopes can be contained within a certain shipping container or package size. Among other things, increasing thickness increases shipping costs because shipping costs are based on volume not weight. For embossments, a trapezoidal shape (from a side view) as illustrated in, e.g., FIG. 1, embossment 101, is superior as compared to a hemispherical side view. From a top view, various embodiments can have a variety of shapes, as discussed above.

Figure 16:
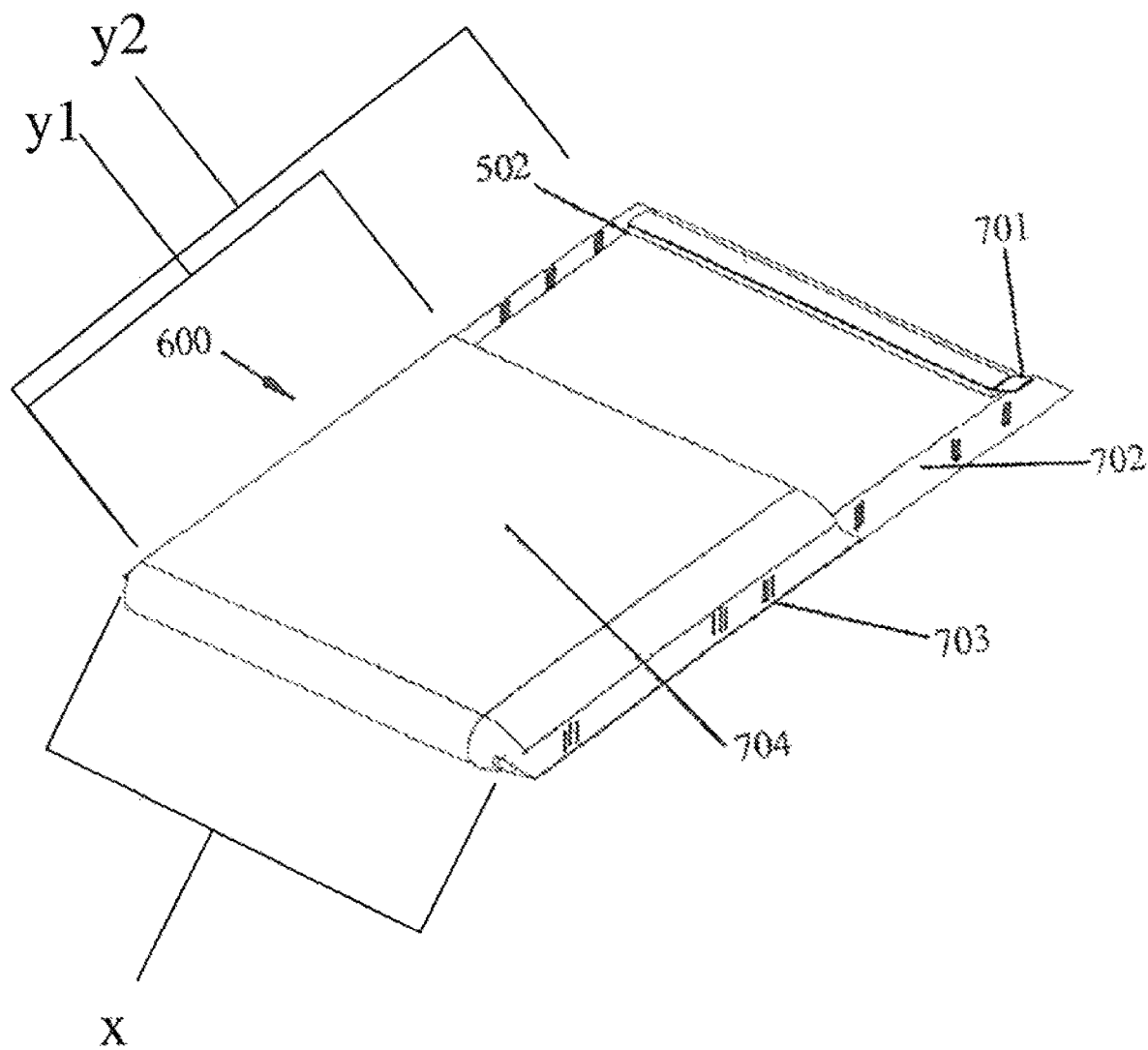
FIG. 16 is a perspective view of a composite unclosed envelope with release liner similar to that shown in FIG. 7 for explanatory purposes.

With reference to FIG. 16, in some preferred embodiments, an embossment pattern is applied upon a substantial portion of the envelope in between end portions, and, in particular, in regions between sealed ends (e.g., laminated ends 403, 703). In the preferred embodiments, a substantial portion of the entire front region having a width x and a length y1 (at the front of the pouch shown) preferably has an embossment pattern applied thereon. Similarly, in preferred embodiments, a substantial portion of the entire rear region having a width x and a length y2 (at the rear of the pouch shown) preferably has an embossment pattern applied thereon. In the preferred embodiments, at least 75% of the entire front region has an embossment pattern applied thereon, and, more preferably, at least 80% of the entire front region has an embossment pattern applied thereon, and, more preferably, at least 90% of the entire front region has an embossment pattern applied thereon. Similarly, in the preferred embodiments, at least 75% of the entire rear region has an embossment pattern applied thereon, and, more preferably, at least 80% of the entire rear region has an embossment pattern applied thereon, and, more preferably, at least 90% of the entire rear region has an embossment pattern applied thereon. Here, the terminology region having an embossment pattern applied thereon is not intended to mean that the embossment itself must consist of a particular percentage of the surface area. But, is intended to mean that the embossment pattern is located at some positions within an identified region. For example, the embossment patterns shown in FIGS. 2 and 12 are illustrated as being on a substantial portion of the illustrated region, and, e.g., shown as covering over 90% of the illustrated region.

EXEMPLARY IMPLEMENTATIONS OF THE INVENTION

Example A (Envelope for use within a container):
layer 1 is indented;
layer 2 is expanded slit sheet (uniformly opening);
layer 3 is expanded slit sheet, (uniformly opening) crossed-pattern with respect to layer 2;
layer 4 is indented.
Example B (Envelope for use within a container):
layer 1 is Kraft paper;
layer 2 is expanded randomly opening slit sheet;
layer 3 is expanded randomly opening slit sheet;
layer 4 is Kraft paper.
Example C (Mailing envelope for mailing via, e.g., UPS, FedEx, USPS, etc.)
layer 1 (outer layer) is Kraft/rip proof;
layer 2 is expanded uniformly opening slit sheet;
layer 3 is expanded uniformly opening slit sheet, and crossed-patterned with respect to layer 2;
layer 4 is indented.
Example D (Mailing envelope for mailing via, e.g., UPS, FedEx, USPS, etc.)
layer 1 (outer layer) is Kraft/rip proof;
layer 2 is expanded randomly opening slit sheet;
layer 3 is expanded randomly opening slit sheet;
layer 4 is indented.
Example E (Mailing envelope for mailing via, e.g., UPS, FedEx, USPS, etc.)
layer 1 (outer layer) is Indented;
layer 2 is expanded randomly opening slit sheet;
layer 3 is expanded randomly opening slit sheet;
layer 4 is indented.
Example F (Mailing envelope for mailing via, e.g., UPS, FedEx, USPS, etc.)
layer 1 (outer layer) is 60# Kraft;
layer 2 is expanded randomly opening slit sheet;
layer 3 is expanded randomly opening slit sheet;
layer 4 is a 30# Kraft.
Example G (Mailing envelope for mailing via, e.g., UPS, FedEx, USPS, etc.)
layer 1 (outer layer) is indented;
layer 2 is expanded randomly opening slit sheet;
layer 3 is expanded randomly opening slit sheet;
layer 4 is a 30# Kraft.
Example H (Mailing envelope for mailing via, etc., UPS, FedEx, USPS, etc.)
layer 1 (outer layer) is one-sided indented facing inward;
layer 2 is expanded randomly opening slit sheet;
layer 3 is expanded randomly opening slit sheet;
layer 4 is a is 2-sided indented.

It should be noted that the expand slit sheets are preferably sealed to at least one of the inner or outer layers of indented paper, Kraft/rip proof, standard Kraft, or other non-slit sheet material. The sealing can be at or proximate to the end regions 403 of FIG. 4, at or proximate to the side regions 402 of FIG. 4, or at both the side and end regions. While the sealing can be to one side region and one end region, preferably, the sealing is to opposing side and/or end regions.

While the example relate to the use of two layers of expanded slit sheets, a single layer can be used because of the sealing of expanded slit sheet to an inner and/or outer layer. Further, the use of more than two layers of expanded slit sheets further enhances the properties of the envelope as illustrated in FIGS. 7 and 8. Thus, at least one layer is employed in the envelope and preferably multiple layers can be employed, as for example, two layers, three layers, four layers, or greater than four layers.

Preferably, two to four layers of expanded slit sheets are employed in the envelope. It should be noted that the number of layers of expanded slit sheets refers to the number of layers between the inner most and outer most layers. Accordingly, when the structure as illustrated in FIGS. 4 and 5 are doubled over as illustrated in FIGS. 7 and 8, the total number of layers of expanded slit sheets in the envelope is doubled while the number of layers of expanded slit sheet layers between the inner most layer and outer most layer is unchanged.

It is noted that the envelopes of the present invention can be recycled by consumers along with, e.g., newspaper, magazines, and corrugated containers.

There are three categories of paper that can be used as feedstocks for making recycled paper: mill broke, pre-consumer waste, and post-consumer waste. Mill broke is paper trimmings and other paper scrap from the manufacture of paper, and is recycled in a paper mill. Pre-consumer waste is a material which left the paper mill but was discarded before it was ready for consumer use. Post-consumer waste is material discarded after consumer use, such as old corrugated containers (OCC), old magazines, and newspapers. Paper suitable for recycling is called "scrap paper", often used to produce molded pulp packaging.

By way of contrast air bubble wrapping sheets and Tyvek® envelopes can be recycled, but it should not be added to a consumer's recycling container. Instead, bubble wrap, Tyvek, and plastic bags should be recycled at special collection points. This guidance applies not only to bubble wrap, but also to completely plastic bubble mailers and to air pillows. Air bubble mailers with paper outsides, however, cannot be recycled as-is. If it is feasible to disassemble them into their separate material parts, one could then recycle the paper along with other paper recyclables, and then take the bubble wrap to a drop-off location along with other plastic films. Information about recycling of plastics can be found at:

http://www.how2recycle.info/sdo and at:
http://www.dupont.com/products-and-services/packaging-materials-solutions/industrial-packaging/articles/recycling-information.html In this application, the use of individual numerical values is stated as approximations as though the values were preceded by the word "about", "substantially", or "approximately." Similarly the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion paper weights and type as well as other considerations known to those of skill in the art to which the disclosed subject matter is most closely related or the art relevant to the range or element at issue will have on the performance of the claimed subject matter. is not considered to be within the ability of one of ordinary skill in the art, or is not explicitly stated in the claims, then the terms "about", "substantially", and "approximately" should be understood to mean the numerical value, plus or minus 15%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. An envelope, comprising:
at least one expanded slit paper sheet in an expanded state, wherein in said expanded state said at least one expanded slit paper sheet exerts a contraction force in a direction of a non- expanded state of the at least one expanded slit paper sheet;
a first paper sheet facing a first face of said at least one expanded slit paper sheet and fixed in relation to said at least one expanded slit paper sheet along at least a portion of a periphery of said at least one expanded slit paper sheet;
a second paper sheet facing said at least one expanded slit paper sheet on an opposite face of said at least one expanded slit paper sheet from said first paper sheet and fixed in relation to said at least one expanded slit paper sheet along at least a portion of said periphery of said at least one expanded slit paper sheet;
wherein said envelop has a pouch with a cushioning wall, with the first paper sheet being an interior layer forming an interior wall of the pouch, the second paper sheet being an exterior layer forming an exterior wall of the pouch, and the at least one expanded slit paper sheet being between the interior layer and the exterior layer; and
wherein either a) at least one of said first paper sheet and said second paper sheet is an embossed sheet having a plurality of embossments that inhibit deformation of said first and second paper sheets due to said contraction force of said at least one expanded slit paper sheet wherein said embossments are distributed across at least one of the interior wall of said pouch and the exterior wall of said pouch or b) said first paper sheet and said second paper sheet are non-embossed sheets having a heavier weight compared to a weight of said at least one expanded slit paper sheet that inhibit deformation of said first and second paper sheets due to contraction forces of said at least one expanded slit paper sheet.

2. The envelope according to claim 1, wherein each of said first paper sheet and said second paper sheet is a non-embossed sheet having a weight of 50# or more under the TAPPI standard paper weight specification for 3000 square feet.

3. The envelope according to claim 1, wherein each of said first paper sheet and said second paper sheet is a sheet having a weight of 50# or more under the TAPPI standard paper weight specification for 3000 square feet.

4. The envelope according to claim 1, wherein said first paper sheet is a non-embossed Kraft sheet having a weight of paper or more under the TAPPI standard paper weight specification for 3000 square feet.

5. The envelope according to claim 4, wherein at least one of said first paper sheet and said second paper sheet is a sheet having a weight of 50# paper or more under the TAPPI standard paper weight specification for 3000 square feet.

6. The envelope according to claim 1, wherein said first and second paper sheets are non-embossed paper sheets.

7. The envelope according to claim 1, wherein said at least one expanded slit paper sheet is at least one substantially rectangular sheet that is fixed to at least one of the first paper sheet and the second paper sheet only at two opposite end regions of said at least one expanded slit paper sheet.

8. The envelope according to claim 7, wherein said two opposite end regions of said at least one expanded slit paper sheet are opposite ends of said at least one expanded slit paper sheet in an expansion direction of the at least one expanded slit paper sheet.

9. The envelope according to claim 8, wherein said at least one expanded paper sheet includes two expanded slit paper sheets that are alongside and directly contact each other.

10. The envelope according to claim 9, wherein said first paper sheet is a non-embossed sheet having a weight of 50# paper or more under the TAPPI standard paper weight specification for 3000 square feet.

11. The envelope according to claim 10, wherein said second paper sheet is a non-embossed sheet having a weight of 50# paper or more under the TAPPI standard paper weight specification for 3000 square feet.

12. The envelope according to claim 11, wherein:
said first paper sheet and said second paper sheet contact said at least one expanded slit paper sheet across a substantial portion of the area of said at least one expanded slit paper sheet but are free from connection to said at least one expanded slit paper sheet across said substantial portion of the area of said at least one expanded slit paper sheet.

13. The envelope according to claim 12, wherein said envelope has a pouch including a cushioning wall, wherein said cushioning wall has four layers, with the first paper sheet forming a first of the four layers and being an interior layer forming an interior wall of the pouch, the two expanded slit paper sheets forming second and third layers of the four layers in between the first and fourth layers and with the second and third layers in direct contact with each other, and the second paper sheet forming the fourth of the four layers and being an exterior layer forming an exterior wall of the pouch.

14. The envelope according to claim 8, wherein said envelope has a pouch including a cushioning wall, with the first paper sheet being an interior layer forming an interior wall of the pouch, the second paper sheet being an exterior layer forming an exterior wall of the pouch, and the at least one expanded slit paper sheet being a single expanded slit paper sheet between the interior layer and the exterior layer.

15. The envelope according to claim 14, wherein said single expanded slit paper sheet contacts both the interior layer and the exterior layer and said cushioning wall.

16. The envelope according to claim 7, wherein said envelope has a pouch including a cushioning wall, with the first paper sheet being an interior layer forming an interior wall of the pouch, the second paper sheet being an exterior layer forming an exterior wall of the pouch, and the at least one expanded slit paper sheet being a single expanded slit paper sheet between the interior layer and the exterior layer.

17. The envelope according to claim 16, wherein said single expanded slit paper sheet contacts both the interior layer and the exterior layer and said cushioning wall.

18. The envelope according to claim 1, wherein said at least one expanded slit paper sheet includes two expanded slit paper sheets that are alongside and directly contact each other.

19. The envelope according to claim 1, wherein:
said first paper sheet and said second paper sheet contact said at least one expanded slit paper sheet within a central portion of said at least one expanded slit paper sheet but are free from connection to said at least one expanded slit paper sheet within said central portion of said at least one expanded slit paper sheet.

20. The envelope according to claim 1, wherein said cushioning wall of said pouch is folded such that the cushioning wall forms both front and back walls of said pouch and such that said second paper sheet is an exterior layer on both front and back faces of the front and back walls of said pouch.

21. The envelope according to claim 20, wherein the back wall of said pouch is longer than the front wall of said pouch, and wherein a portion of said first paper sheet that extends beyond an end of the front wall has an adhesive strip fixed thereto with a removable release liner for adhesively closing said envelope by removing the release liner and adhering said adhesive strip to the front wall.

22. The envelope according to claim 20, wherein the envelope includes a shipping label receiving region on an exterior of the envelope.

23. The envelope according to claim 22, further including a shipping label adhered to the shipping label receiving region.

24. The envelope according to claim 23, wherein said shipping label includes postage information.

25. The envelope according to claim 24, wherein said shipping label includes address information.

26. The envelope according to claim 1, wherein:
said envelope is made from recyclable paper.

27. The envelope according to claim 1, wherein:
said at least one expanded slit paper sheet in an expanded state includes a plurality of expanded slit paper sheets in an expanded state layered alongside each other.

28. A method, comprising:
a) providing the envelope of claim 1; and
b) placing an item within a pouch of said envelope with said at least one expanded slit paper sheet providing cushioning to protect said item within said pouch.

29. The method of claim 28, further including recycling said envelope.

30. The method of claim 28, further including providing said envelop with recyclable paper.

31. The method of claim 30, further including recycling said recyclable paper envelope.

32. The envelope according to claim 1, wherein at least one of said first paper sheet and said second paper sheet is an embossed sheet having a plurality of embossments that inhibit deformation of said first and second paper sheets due to the contraction force of said at least one expanded slit paper sheet wherein said embossments are distributed across at least one of the interior wall of said pouch and the exterior wall of said pouch.

33. The envelope according to claim 32, wherein the embossments include a plurality of like shapes distributed in an array across at least one of the interior wall of said pouch and the exterior wall of said pouch.

34. The envelope according to claim 33, wherein said like shapes include polygons.

35. The envelope according to claim 34, wherein said polygons include hexagons.

36. The envelope according to claim 33, wherein said plurality of like shapes each have a maximum diameter of between about 0.1 to 2 inches.

37. The envelope according to claim 33, wherein said plurality of like shapes each have a maximum height or depth of less than 0.1 inches.

38. The envelope according to claim 33, wherein said plurality of like shapes each have a maximum diameter of between about 0.2 to 2 inches.

39. The envelope according to claim 38, wherein said plurality of like shapes include a plurality of polygons.

40. The envelope according to claim 32, wherein said embossments are applied upon a substantial portion of the envelope in between end portions.

41. The envelope according to claim 32, wherein said embossments are applied upon a substantial portion of the envelope in between regions between sealed ends.

42. The envelope according to claim 32, wherein:
said embossments are indented towards said at least one expanded slit paper sheet within at least a label-receiving region of a face of the embossed paper sheet.

43. The envelope according to claim 42, further including:
an address label fixed to said label-receiving region.

44. The envelope according to claim 32, wherein:
said embossments bulge outwardly from said at least one expanded slit paper sheet and face into an interior of a pouch of said envelope, whereby said embossments help to limit friction applied to an item that is inserted into said pouch.

45. The envelop according to claim 32, wherein said plurality of embossments include an array of embossed shapes distributed on a face of the embossed paper sheet.

46. The envelope according to claim 32, wherein said embossments each have a maximum height or depth of less than 0.1 inches.

47. The envelope according to claim 32, wherein said embossments each have a maximum height or depth of less than 0.075 inches.

48. The envelope according to claim 32, wherein said embossments each have a maximum height or depth of less than 0.05 inches.

49. The envelope according to claim 48, wherein said embossments each have a maximum height or depth of between about 0.02 to 0.03 inches.

50. The envelope according to claim 32, wherein said embossments each have a maximum height or depth of between about 0.02 to 0.03 inches.

51. The envelop according to claim 1, wherein said at least one expanded slit paper sheet is a single expanded slit paper sheet, such that said envelope includes only a single-layer of expanded slit sheet paper.

52. The envelop according to claim 1, wherein said envelope includes an exterior layer of embossed paper having downward facing embossments.

53. The envelope according to claim 1, wherein said envelope includes an interior layer of embossed paper having both upward and downward facing embossments.

54. The envelope according to claim 1, wherein said at least one expanded slit paper sheet is an extensible sheet having an extensibility of greater than 3% in both a machine direction and in a cross direction.

55. The envelope according to claim 1, wherein said at least one expanded slit paper sheet is an extensible sheet having an extensibility of greater than 5% in both a machine direction and in a cross direction.

56. The envelope according to claim 1, wherein said at least one expanded slit paper sheet is an extensible sheet having an extensibility of between 3-15% in a machine direction.

57. The envelope according to claim 1, wherein said at least one expanded slit paper sheet is an extensible sheet having an extensibility of between 3-20% in a machine direction.

58. The envelope according to claim 1, wherein said envelope has a pouch including a cushioning wall, with the first paper sheet being an interior layer forming an interior wall of the pouch, the second paper sheet being an exterior layer forming an exterior wall of the pouch, and the at least one expanded slit paper sheet being a single expanded slit paper sheet between the interior layer and the exterior layer.

59. The envelope according to claim 58, wherein said single expanded slit paper sheet contacts both the interior layer and the exterior layer and said cushioning wall.

60. The envelope according to claim 1, wherein at least one of said first paper sheet and said second paper sheet is a non-embossed sheet having a weight of 60# or more under the TAPPI standard paper weight specification for 3000 square feet.

61. The envelope according to claim 60, wherein each of said first paper sheet and said second paper sheet is a non-embossed sheet having a weight of 60# or more under the TAPPI standard paper weight specification for 3000 square feet.

62. The envelope according to claim 1, wherein at least one of said first paper sheet and said second paper sheet is a non-embossed Kraft sheet having a weight of 60# paper or more under the TAPPI standard paper weight specification for 3000 square feet.

63. The envelope according to claim 62, wherein each of said first paper sheet and said second paper sheet is a non-embossed Kraft sheet having a weight of 60# paper or more under the TAPPI standard paper weight specification for 3000 square feet.

64. The envelope according to claim 1, wherein at least one of said first paper sheet and said second paper sheet has a weight of 30# or more under the TAPPI standard paper weight specification for 3000 square feet.

65. The envelope according to claim 64, wherein each of said first paper sheet and said second paper sheet has a weight of 30# or more under the TAPPI standard paper weight specification for 3000 square feet.

66. The envelope according to claim 1, wherein at least one of said first paper sheet and said second paper sheet is a Kraft sheet having a weight of 30# paper or more under the TAPPI standard paper weight specification for 3000 square feet.

67. The envelope according to claim 66, wherein each of said first paper sheet and said second paper sheet is a Kraft sheet having a weight of 30# paper or more under the TAPPI standard paper weight specification for 3000 square feet.

68. A method of making an envelope, comprising:
providing at least one expandable slit paper sheet;
providing a first paper sheet for facing a first face of said at least one expandable slit paper sheet;
providing a second paper sheet for facing the at least one expanded slit paper sheet on an opposite face of the at least one expanded slit paper sheet from the first paper sheet;
expanding the at least one expanded slit paper sheet to an expanded state and fixing the at least one expanded slit paper sheet at at least opposite portions of a periphery of the at least one expanded slit paper sheet in relation to the first paper sheet and the second paper sheet, the at least one expanded slit paper sheet in the expanded state exerting a contraction force in a direction of a non-expanded state of the at least one expanded slit paper sheet;
forming a cushioning wall for the envelop with the first paper sheet being an interior layer forming an interior wall of the pouch, the second paper sheet being an exterior layer forming an exterior wall of the pouch, and the at least one expanded slit paper sheet being between the interior layer and the exterior layer; and inhibiting deformation of said first and second paper sheets in response to said contraction force of said at least one expanded slit paper sheet by either a) providing at least one of the first paper sheet and the second paper sheet with a plurality of embossments that are distributed across at least one of the interior wall of the pouch and the exterior wall of the pouch or b) providing the first paper sheet and the second paper sheet as non-embossed sheets having a heavier weight compared to a weight of the at least one expanded slit paper sheet sufficient to inhibit deformation of the first and second paper sheets.

69. The method of making an envelope according to claim 68, wherein said step of inhibiting deformation of said first and second paper sheets in response to contraction forces of said at least one expanded slit paper sheet includes providing each of the first paper sheet and the second paper sheet as non-embossed sheets each having a weight of 50# or more under the TAPPI standard paper weight specification for 3000 square feet.

70. The method of making an envelope according to claim 68, further including providing the at least one expanded slit paper sheet as at least one substantially rectangular sheet and fixing the at least one expanded slit paper sheet to at least one of the first paper sheet and the second paper sheet only at two opposite end regions of said at least one expanded slit paper sheet.

71. The method of making an envelope according to claim 70, wherein said fixing the two opposite end regions of said at least one expanded slit paper sheet includes fixing opposite ends of said at least one expanded slit paper sheet in an expansion direction of the at least one expanded slit paper sheet.

72. The method of making an envelope according to claim 68, further including providing said at least one expanded slit paper sheet with two expanded slit paper sheets that are alongside and directly in contact with each other.

73. The method according to claim 68, wherein said step of inhibiting deformation includes providing at least one of said first paper sheet and said second paper sheet as a sheet having a weight of 50# or more under the TAPPI standard paper weight specification for 3000 square feet.

74. The method according to claim 68, wherein said step of inhibiting deformation includes providing each of said second paper sheet as a sheet having a weight of 50# paper or more under the TAPPI standard paper weight specification for 3000 square feet.

75. The method according to claim 68, wherein said step of inhibiting deformation includes providing at least one of each of said first paper sheet and said second paper sheet as a non-embossed Kraft sheet having a weight of 50# or more under the TAPPI standard paper weight specification for 3000 square feet.

76. The method according to claim 75, wherein said step of inhibiting deformation includes providing each of said first paper sheet and said second paper sheet as a non-embossed Kraft sheet having a weight of 50# paper or more under the TAPPI standard paper weight specification for 3000 square feet.

77. The method according to claim 68, wherein said step of inhibiting deformation includes providing at least one of said first paper sheet and said second paper sheet as a sheet having a weight of 30# or more under the TAPPI standard paper weight specification for 3000 square feet.

78. The method according to claim 77, wherein said step of inhibiting deformation includes providing each of said second paper sheet as a sheet having a weight of 30# paper or more under the TAPPI standard paper weight specification for 3000 square feet.

79. The method according to claim 68, wherein said step of inhibiting deformation includes providing at least one of each of said first paper sheet and said second paper sheet as a Kraft sheet having a weight of 30# or more under the TAPPI standard paper weight specification for 3000 square feet.

80. The method according to claim 79, wherein said step of inhibiting deformation includes providing each of said first paper sheet and said second paper sheet as a Kraft sheet having a weight of 30# paper or more under the TAPPI standard paper weight specification for 3000 square feet.

81. The method of claim 68, wherein
said providing at least one expandable slit paper sheet, includes feeding a first expandable slit paper sheet from a roll of slit sheet paper in an unexpanded state and expanding a distal region of the first expandable slit paper sheet fed from the roll into an expanded state;
said providing a first paper sheet includes providing said first paper sheet facing a first face of said first expandable slit paper sheet within the distal region that is in said expanded state;
said providing a second paper sheet includes providing said second paper sheet facing an opposite face of said first expandable slit paper sheet within the distal region that is in said expanded state.

82. The method of claim of claim 81, wherein
expanding a distal region of the first expandable slit paper sheet includes feeding the first expandable slit paper sheet to a stretching roll that stretches the first expandable slit paper sheet.

83. The method of claim of claim 81, wherein
said stretching roll stretches the first expandable slit paper sheet using a braking mechanism that slows the relative speed of the first expandable slit paper sheet fed from the roll with respect to the stretching roll.

84. The method of claim 83, wherein said stretching roll is a Velcro roll.

85. The method of claim 81, further including adhering together areas of said first paper sheet, said first expandable slit paper sheet and said second paper sheet within said distal region that is in said expanded state.

86. The method of claim 85, wherein said adhering together areas of said first paper sheet, said first expandable slit paper sheet and said second paper sheet within said distal region that is in said expanded state includes trapping the expandable slit paper sheet between said first paper sheet and said second paper sheet in said expanded state.

87. The method of claim 81, further including adhering together areas of said first paper sheet and said second paper sheet within said distal region, including laminating together side edges, at lateral sides in a conveying direction from said roll, of said first paper sheet and said second paper sheet.

88. The method of claim 87, wherein said laminating together side edges includes employing crushing wheels to laminate said side edges.

89. The method of claim 87, further including adhering together areas of said first paper sheet, said first expandable slit paper sheet and said second paper by laminating together said first paper sheet, said first expandable slit paper sheet and said second paper sheet in a direction transverse to the conveying direction from said roll such as to trap the first expandable slit paper sheet between said first paper sheet and said second paper sheet in said expanded state.

90. The method of claim 89, wherein said laminating together in a direction transverse to the conveying direction includes employing crushing wheels to laminate.

91. The method of claim 89, further including separating an individual pad from a segment of the adhered first paper sheet, said first expandable slit paper sheet and said second paper sheet within said distal region.

92. The method of claim 91, further including folding the individual pad to create a pouch and adhering together lateral side edges of said pouch.

93. The method of claim 92, further including said folding creating an extending fold-over area and further including applying an adhesive strip and release liner along said extending fold-over area that is configured to seal said pouch.

94. The method of claim 68, further including providing said at least one expandable slit paper sheet from an extensible paper.

95. The method of claim 94, further including providing said extensible paper as an extensible paper having an extensibility in the machine direction and the cross direction, wherein the extensibility in the machine direction is greater than 3%.

96. The method of claim 94, further including providing said extensible paper as an extensible paper having an extensibility in the machine direction and the cross direction, wherein the extensibility in the machine direction is between 3 to 20%.

97. The method of claim 94, further including providing said extensible paper as an extensible paper having an extensibility in the machine direction and the cross direction, wherein the extensibility in the machine direction is between 3 to 9%.

98. The method of claim 94, further including providing said extensible paper as an extensible paper having an extensibility of not less than 5% in both machine and cross directions.

99. The method of claim 94, wherein said extensible paper is formed by passing a moist paper web between two members moving at different speeds to impart extensibility.

100. An envelope, comprising:
at least one expanded slit paper sheet in an expanded state;
a first paper sheet facing a first face of said at least one expanded slit paper sheet and fixed in relation to said at least one expanded slit paper sheet along at least a portion of a periphery of said at least one expanded slit paper sheet;
a second paper sheet facing said at least one expanded slit paper sheet on an opposite face of said at least one expanded slit paper sheet from said first paper sheet and fixed in relation to said at least one expanded slit paper sheet along at least a portion of said periphery of said at least one expanded slit paper sheet;
wherein either a) at least one of said first paper sheet and said second paper sheet are embossed sheets having a plurality of embossments that inhibit deformation of said first and second paper sheets due to contraction forces of said at least one expanded slit paper sheet or b) at least one of said first paper sheet and said second paper sheet are non-embossed sheets having a heavier weight compared to a weight of said at least one expanded slit paper sheet that inhibit deformation of said first and second paper sheets due to contraction forces of said at least one expanded slit paper sheet, and
wherein said at least one expanded slit paper sheet is at least one substantially rectangular sheet that is fixed to at least one of the first paper sheet and the second paper sheet only at two opposite end regions of said at least one expanded slit paper sheet.

101. The envelope according to claim 100, wherein said two opposite end regions of said at least one expanded slit paper sheet are opposite ends of said at least one expanded slit paper sheet in an expansion direction of the at least one expanded slit paper sheet.

102. The envelope according to claim 100, wherein at least one of said first paper sheet and said second paper sheet has a weight of 50# or more under the TAPPI standard paper weight specification for 3000 square feet.

103. The envelope according to claim 102, wherein each of said first paper sheet and said second paper sheet has a weight of 50# or more under the TAPPI standard paper weight specification for 3000 square feet.

104. The envelope according to claim 100, wherein at least one of said first paper sheet and said second paper sheet is a Kraft sheet having a weight of 50# paper or more under the TAPPI standard paper weight specification for 3000 square feet.

105. The envelope according to claim 104, wherein each of said first paper sheet and said second paper sheet is a Kraft sheet having a weight of 50# paper or more under the TAPPI standard paper weight specification for 3000 square feet.

106. The envelop according to claim 100, wherein said at least one expandable slit paper sheet is made of an extensible paper.

107. The envelop according to claim 106, wherein said extensible paper is extensible in the machine direction and the cross direction, wherein the extensibility in the machine direction is greater than 3%.

108. The envelop according to claim 106, wherein said extensible paper is extensible in the machine direction and the cross direction, wherein the extensibility in the machine direction is between 3 to 20%.

109. The envelop according to claim 106, wherein said extensible paper is extensible in the machine direction and the cross direction, wherein the extensibility in the machine direction is between 3 to 9%.

110. The envelop according to claim 106, wherein said extensible paper has an extensibility of not less than 5% in both machine and cross directions.

111. The envelop according to claim 106, wherein said extensible paper is extensible formed by passing a moist paper web between two members moving at different speeds to impart extensibility.

112. The envelope according to claim 100, wherein at least one of said first sheet and said second sheet includes a plurality of embossments, wherein said embossments each have a maximum height or depth of less than 0.1 inches.

113. The envelope according to claim 112, wherein said embossments each have a maximum height or depth of less than 0.075 inches.

114. The envelope according to claim 113, wherein said embossments each have a maximum height or depth of less than 0.05 inches.

115. The envelope according to claim 100, wherein said at least one expandable slit paper sheet includes a first expandable slit paper sheet, and said envelope includes said first paper sheet, said first expandable slit paper sheet and said second paper sheet being connected together along at least opposite sides of the first expandable slit paper sheet in the expansion direction of said first expandable slit paper sheet such that the first expandable slit paper sheet is maintained in said expanded state.

116. The envelope according to claim 100, wherein said first paper sheet and said second paper sheet are adhered together along lateral sides of the envelope that extend parallel to an expansion direction of the first expandable slit paper sheet.

117. The envelope of claim 116, wherein said envelope includes a pouch with an opening that is along a side that is transverse to said lateral sides of the envelope.

118. The envelope of claim 100, wherein said envelope is formed of a substantially rectangular composite of said first sheet, said second sheet and said at least one expandable slit paper sheet, that is laminated around peripheral edges such that said first and second sheet are connected together along all four peripheral edges and said at least one expandable sheet is connected with the first and/or second sheets at least along opposite ones of said peripheral edges in an expansion direction of the at least one expandable slit paper sheet, which composite is folded over along a fold line, and adhered together along lateral sides transverse to said fold line.

119. The envelope of claim 118, wherein said envelope further includes a mouth opening into a pouch at a location parallel to said fold line and includes a fold-over flap area that extends further in a direction transverse to said mouth away from said fold line, which fold-over flap area is configured to fold over said mouth to close the envelope.

120. The envelope of claim 119, wherein said fold-over flap area includes an adhesive strip and release liner configured to seal said pouch.

121. The envelope of claim 100, wherein said pouch is substantially rectangular, and includes a composite of said first sheet, said second sheet and said at least one expandable slit paper sheet, that is folded over at a fold line, and wherein one end of said envelope is delineated along said fold line, lateral sides transverse to said fold line include adhered sections between at least the first and second sheets extending along a length of said lateral sides, a mouth into a pouch of said envelope extends parallel to said fold line and includes an adhered section between the first and second sheets, and a fold-over flap area extends past said mouth to another adhered section between the first and second sheets, which fold-over flap area is configured to be folded over to close said mouth.

122. The envelope of claim 121, wherein said fold-over flap area includes an adhesive for sealing of said pouch once folded over to close said mouth.

123. The envelope of claim 100, wherein said envelope is made of recyclable paper.

\* \* \* \* \*